United States Patent [19]

Wakai et al.

[11] Patent Number: 5,596,647
[45] Date of Patent: Jan. 21, 1997

[54] INTEGRATED VIDEO AND AUDIO SIGNAL DISTRIBUTION SYSTEM AND METHOD FOR USE ON COMMERCIAL AIRCRAFT AND OTHER VEHICLES

[75] Inventors: Bruce M. Wakai, Cypress; John E. Lemmer, Laguna Hills; William A. Frost, Jr., San Juan Capistrano, all of Calif.

[73] Assignee: Matsushita Avionics Development Corporation, Irvine, Calif.

[21] Appl. No.: 71,218

[22] Filed: Jun. 1, 1993

[51] Int. Cl.⁶ ........................................ H04J 3/02
[52] U.S. Cl. ........................................ 381/77; 381/29
[58] Field of Search ........................ 381/77, 29, 31; 348/8, 836; 370/7, 118

[56] References Cited

U.S. PATENT DOCUMENTS

| | | | |
|---|---|---|---|
| 3,795,771 | 3/1974 | Gundersen et al. | 370/15 |
| 4,208,740 | 6/1980 | Yin et al. | 370/7 |
| 4,428,078 | 1/1984 | Kuo | 455/6.3 |
| 4,774,514 | 9/1988 | Hildebrandt et al. | 340/971 |
| 4,835,604 | 5/1989 | Kondo et al. | 348/8 |
| 4,866,515 | 9/1989 | Tagawa et al. | 348/8 |
| 5,123,015 | 6/1992 | Brady, Jr. et al. | 370/112 |

*Primary Examiner*—Stephen Brinich
*Attorney, Agent, or Firm*—Lyon & Lyon

[57] ABSTRACT

A passenger entertainment system employing an improved digital audio signal distribution system and method for use on commercial aircraft and other vehicles. A plurality of digital audio signal sources are provided for generating a plurality of compressed digital audio signals. The compressed digital audio signals are provided to a multiplexer which domain multiplexes those signals to produce a single composite digital audio data signal. The composite digital audio data signal is provided to a demultiplexer which is capable of selecting a desired channel from the composite digital audio data signal. The selected channel is provided to a decompression circuit, where it is expanded to produce a decompressed digital output signal. The decompressed digital output signal is then provided to a digital-to-analog converter and converted to an analog audio signal. The analog audio signal is provided to an audio transducer.

2 Claims, 16 Drawing Sheets

PRIOR ART SYSTEMS

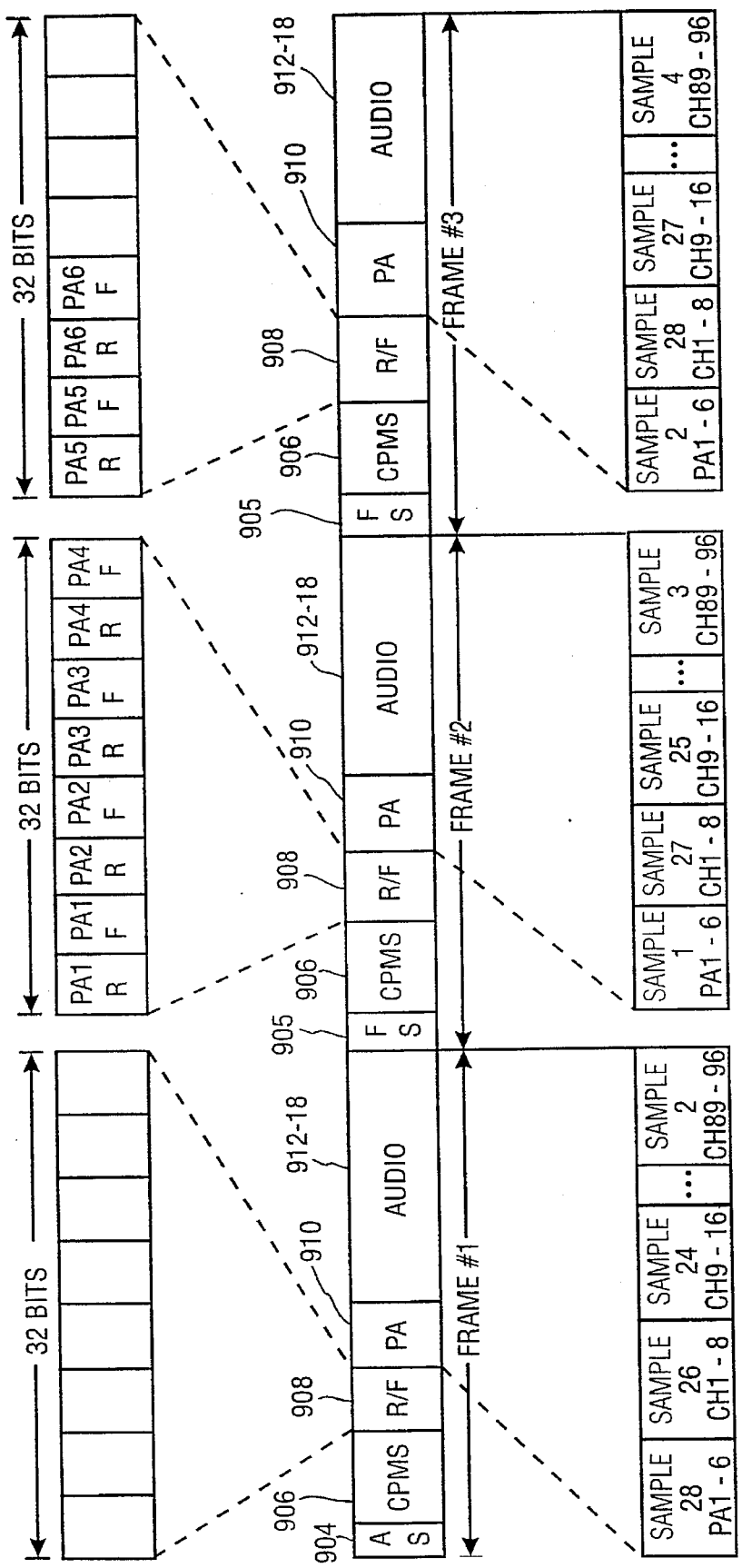

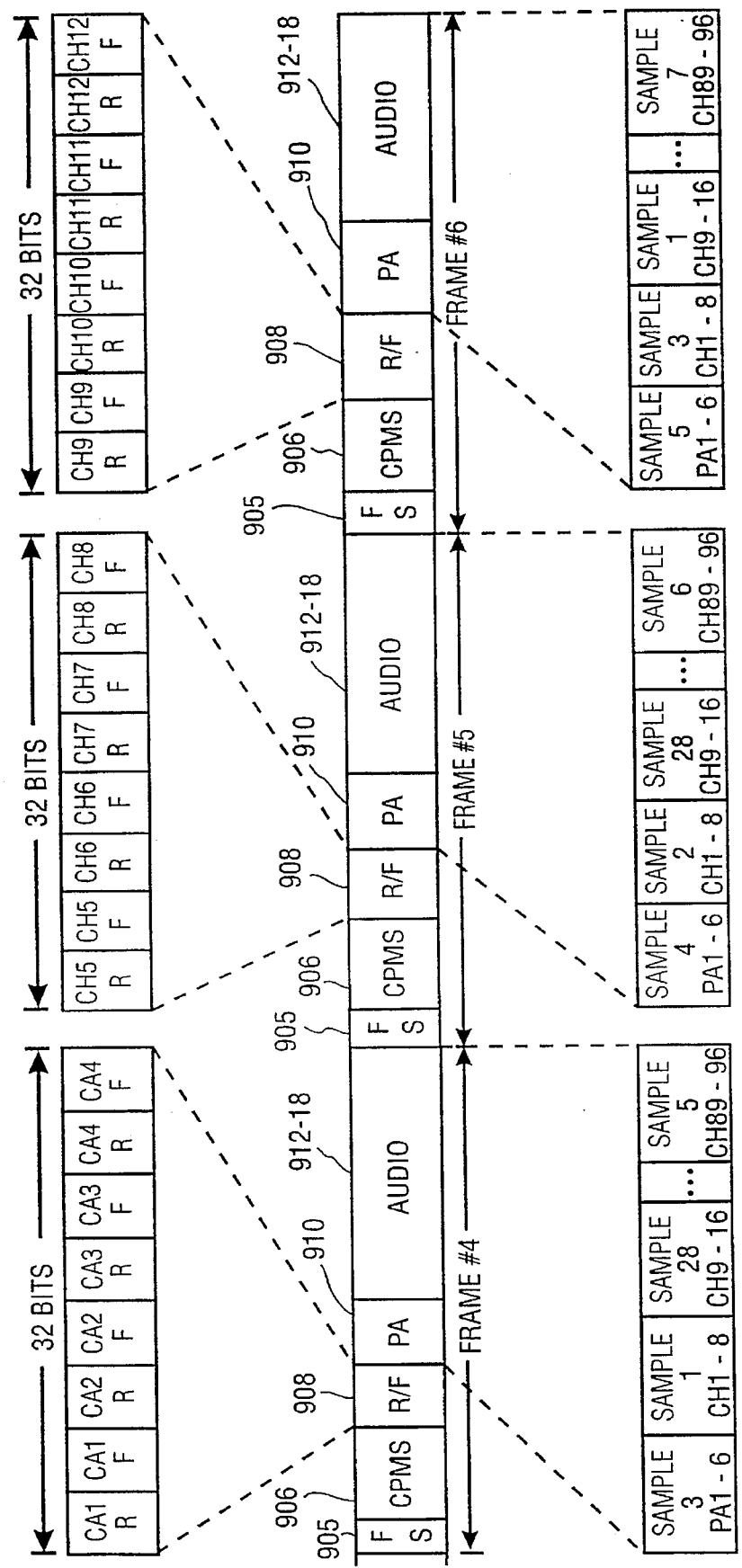

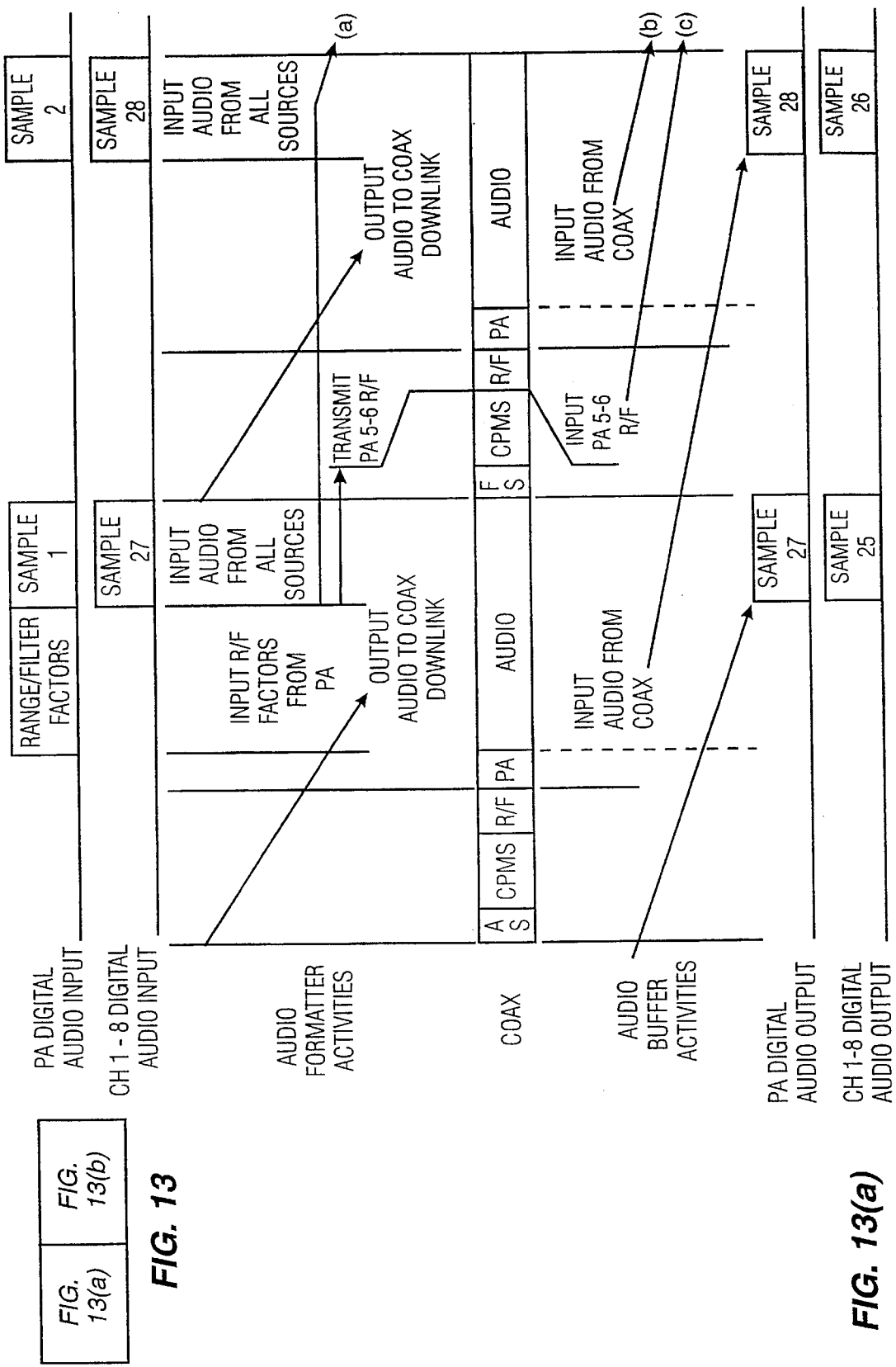

INTEGRATED VIDEO AND AUDIO SIGNAL DISTRIBUTION SYSTEM AND METHOD FOR USE ON COMMERCIAL AIRCRAFT AND OTHER VEHICLES

FIELD OF THE INVENTION

The field of the present invention is onboard entertainment systems for use in large commercial aircraft and other passenger vehicles.

Recently, substantial attention has been directed to the design and implementation of cabin entertainment and communications systems for use in large commercial aircraft. Examples of such systems are disclosed in U.S. Pat. No. 3,795,771, entitled "Passenger Entertainment/Passenger Service and Self-Test System;" U.S. Pat. No. 4,428,078, entitled "Wireless Audio Passenger Entertainment System (WAPES);" U.S. Pat. No. 4,774,514, entitled "Method and Apparatus for Carrying Out Passenger-Related and Flight Attendant-Related Functions in an Airplane;" U.S. Pat. No. 4,835,604, entitled "Aircraft Service System with a Central Control System for Attendant Call Lights and Passenger Reading Lights;" U.S. Pat. No. 4,866,515, entitled "Passenger Service and Entertainment System for Supplying Frequency-Multiplexed Video, Audio, and Television Game Software Signals to Passenger Seat Terminals;" and U.S. Pat. No. 5,123,015, entitled "Daisy Chain Multiplexer".

As shown in FIG. 1, conventional (or prior art) passenger entertainment systems 1, such as those disclosed in the previously identified patents, generally comprise a plurality of audio signal sources 2 (e.g. compact disc players and audio tape players), a plurality of analog-to-digital (A/D) converters 3 for converting analog signals generated by the audio signal sources to a digital format, a multiplexer 4 for time domain multiplexing (combining) the converted digital signals, a signal distribution network 5 for conveying the multiplexed signal to a plurality of remote locations, at least one demultiplexer 6 for demultiplexing the combined signal and selecting one or more channels from the combined signal, a plurality of digital-to-analog (D/A) converters 7 for converting the selected channels to an analog format, and a plurality of audio transducers 8 which convert the analog signal(s) to sound waves.

Those skilled in the art will appreciate that, while conventional compact disc players are capable of providing digital signal outputs, those digital signal outputs are simply not used in conventional passenger entertainment systems. One primary reason for this is that compact disc players generally include their own internal oscillators and, thus, if a plurality of conventional compact disc players are utilized, their respective digital outputs will be asynchronous. This makes the combination of a plurality of digital outputs quite difficult. Another primary reason that the digital outputs of conventional compact disc players are not utilized is that conventional compact disc players provide a digital signal output having a 16-bit sample size and a 44 kHz sampling rate. This makes it difficult to distribute a large number of channels (for example, fifty channels or more) over an audio signal distribution network without exceeding desirable power consumption levels or incurring significant bit error rates. For example, if a conventional compact disc player output having a 16-bit sample size and a 44 kHz sampling rate is to be utilized in a 72-channel system, a transfer rate exceeding 50 megabits per second would be required. However, conventional systems capable of achieving a 50 megabit per second transfer rate require considerably more power than is desirable in an aircraft environment. In addition, these systems require heavier circuitry, generate more heat, and occupy more space than is desirable in an aircraft environment.

Those skilled in the art will appreciate also that, as data transfer rates are increased, cable attenuation and distortion also increase. These increases in cable attenuation and distortion contribute substantially to transmission difficulties and, in particular, to increased bit-error rates.

As a means for reducing data transfer rates and eliminating many of the complications in data transmission which result therefrom, conventional passenger entertainment systems utilize the analog output signals S1 provided by conventional compact disc players 2 and convert those output signals to a digital format using an analog-to-digital (A/D) converter 3. In this fashion, the sample size and sampling rate of the converted signal may be selected so as to minimize the transfer rate required to distribute a large number of channels. This technique, however, while making it possible to obtain a more desirable transfer rate, substantially sacrifices audio fidelity or quality. More specifically, as the sample size and sampling rate of the converted signal are reduced, the resolution of the digital representation of the original analog audio signal is diminished, and substantial signal degradation may result due to quantization error. This signal degradation places a practical limit on the extent to which the sample size and sampling rate may be reduced. Those skilled in the art will appreciate also that in an aircraft environment substantial background noise may be introduced into the system whenever a signal is distributed in an analog format. Moreover, the most common type of noise in an aircraft environment is produced by the aircraft power distribution system and has a frequency of approximately 400 Hz. This type of noise will hereinafter be referred to as "400 Hz background noise." Because of this 400 Hz background noise, unless substantial shielding is utilized, it is very difficult on an aircraft to convert an analog audio source signal to a digital format without including substantial background noise in the resulting digital signal. As indicated above, however, it appears to be universally accepted among manufactures of conventional passenger entertainment systems that, to achieve satisfactory data transfer rates and satisfactory power consumption levels, it is necessary to utilize the analog output signals of conventional compact disc players and to convert those analog output signals to a digital format having a sufficiently low sample size and sampling rate. For this reason, the presence of a substantial quantity of quantization noise, 400 Hz background noise, signal cross-talk, and the like is inherent in all conventional passenger entertainment and audio signal distribution systems.

SUMMARY OF THE INVENTION

The present invention is directed to an improved passenger entertainment system, which employs an improved audio signal distribution system and method, for use in commercial aircraft and other vehicles. By employing the system and method of the present invention, high channel capacity and low power consumption are achieved, while substantial immunity to quantization noise, background noise, cross-talk, and the like is maintained.

In one preferred form, a passenger entertainment system in accordance with the present invention comprises a plurality of "true" digital signal sources (for example, a plurality of specialized compact disc players capable of providing a compressed digital audio signal output), a multiplexer, a signal distribution network, at least one demultiplexer, at least one decompression circuit, at least one digital-to-analog converter, and at least one audio transducer.

The digital audio signal sources receive clock and enable signals from the multiplexer and, in response, provide a plurality of compressed digital audio signals to the multiplexer. The multiplexer multiplexes the compressed digital audio source signals to create a composite digital audio signal and delivers the composite digital audio signal to the distribution network. The distribution network carries the digital composite signal to at least one remote location where a demultiplexer is disposed. The demultiplexer selects one or more desired channels (or signals) from the composite signal and provides the selected channels to a decompression circuit. Each decompression circuit decompresses the channels delivered thereto and provides each of the resulting expanded digital audio signals to a digital-to-analog converter. Each digital-to-analog converter converts the expanded digital audio signal delivered thereto to an analog audio signal which is then provided to an audio transducer disposed, for example, in a passenger headset. Finally, each audio transducer generates sound waves in response to the analog audio signal delivered thereto.

Those skilled in the art will recognize that, because a passenger entertainment system in accordance with the present invention maintains transmitted digital audio data in a compressed digital format until that data reaches a remote seat location, substantial immunity to quantization noise, background noise, cross-talk, and the like is achieved. In contrast, conventional passenger entertainment systems, which require that all audio data be provided in an analog format and, then, be converted to a digital format, are inherently prone to picking up 400 Hz background noise which may cause substantial signal degradation. More specifically, any signal which exists in an analog format in the noisy environment of a commercial aircraft is subject to distortion or degradation resulting from 400 Hz background noise. If an audio source signal is allowed to exist in an analog format that signal may become distorted as set forth above before it is converted to a digital format, and any signal resulting after an analog-to-digital conversion will represent the distorted audio signal, not the original audio signal. For this reason, users of conventional passenger entertainment systems must provide substantial shielding on incoming and outgoing signal lines or employ substantial decontamination (noise reduction) circuitry. If they do not, they must accept the presence of substantial noise in the transmitted audio signal.

Finally, those skilled in the art will recognize that, by utilizing digital signal sources capable of providing compressed digital audio signals to the signal distribution network via the multiplexer and later decompressing those signals, the passenger entertainment system of the present invention achieves far superior signal reproduction than that which is achievable using the A/D conversion technique characteristic of prior art systems. More specifically, when the systems of the prior art (including those disclosed in the previously identified patents) convert analog audio signals provided by conventional compact disc players to digital signals having, for example, an 8-bit sample size and a 20–30 kHz sampling rate, signal resolution and, therefore, signal fidelity or quality is sacrificed substantially. In contrast, when a digital signal having a 16-bit sample size and a 37.8 kHz sampling rate is compressed to produce a digital signal having a 4-bit sample size and the same sampling rate in accordance with the present invention, signal degradation is encountered, but only to a very small degree. Stated somewhat differently, digital signal compression yields close to a 4-to-1 reduction in the volume of data to be transported over the signal distribution network without incurring a noticeable degradation in sound quality.

In a preferred form, the passenger entertainment system of the present invention may comprise, in addition to the digital audio signal distribution system described above, a plurality of analog video signal sources, a plurality of analog audio signal sources, a passenger address system, a plurality of overhead video projectors, a plurality of inseat video displays, and a modular signal distribution network capable of transmitting all audio and video signals to a plurality of remote seat locations over a single coaxial cable. These embodiments are discussed more fully below in the section entitled "Detailed Description."

In light of the above, it is an object of the present invention to provide an improved passenger entertainment system, which employs an improved digital audio signal distribution system and method, for use on commercial aircraft and other vehicles.

It is a further object of the present invention to provide an improved passenger entertainment system, which employs an improved integrated video and audio signal distribution system and method, for use on commercial aircraft and other vehicles.

It is a still further object of the present invention to provide a passenger entertainment system which is capable of distributing an integrated video and compressed digital audio signal over a single coaxial cable.

It is a still further object of the present invention to provide a method for efficiently transmitting digital signal compression factors over digital signal distribution networks such as those utilized on commercial aircraft and other vehicles.

BRIEF DESCRIPTION OF THE DRAWINGS

FIG. 12 shows a proper relationship between FIGS. 12(a) and 12(b).

FIGS. 12(a) and 12(b) illustrate the timing of sync signals and range and filter factors within a frame format in accordance with the present invention.

FIG. 13 shows a proper relationship between FIG. 13(a) and 13(b).

FIGS. 13(a) and 13(b) illustrate preferred IVAS gate array timing relationships between input data, data on a coax transmission cable, and output data.

DETAILED DESCRIPTION

Figure 1:
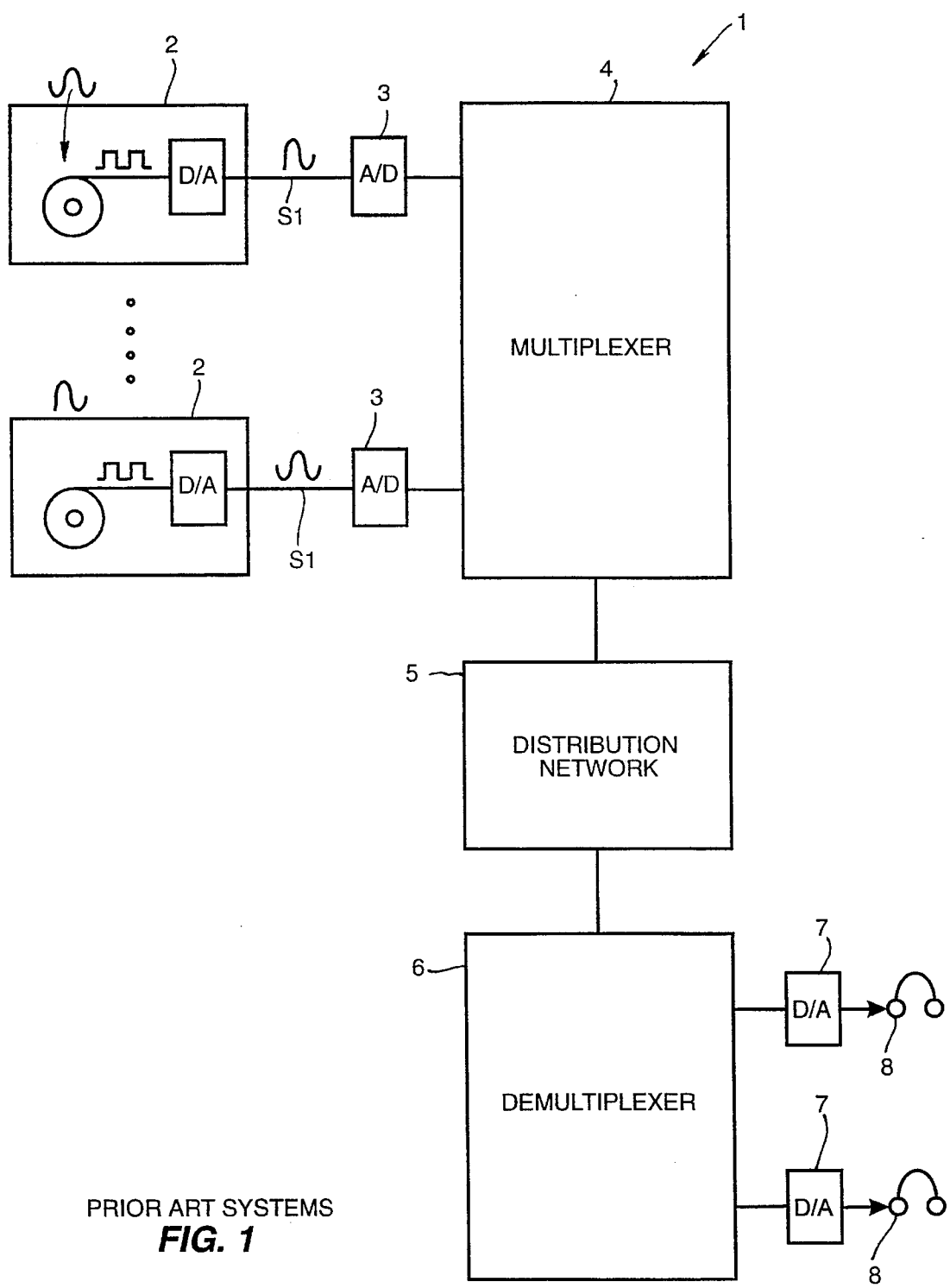
FIG. 1 is a block diagram illustrating the basic components of a conventional audio signal distribution system commonly used on commercial aircraft and other vehicles.

In an effort to highlight various embodiments and innovative aspects of the present invention, a number of subheadings are provided in the following discussion. In addition, where a given structure appears in several drawings, that structure is labeled using the same reference numeral in each drawing.

Digital Audio Signal Distribution System

Figure 2:
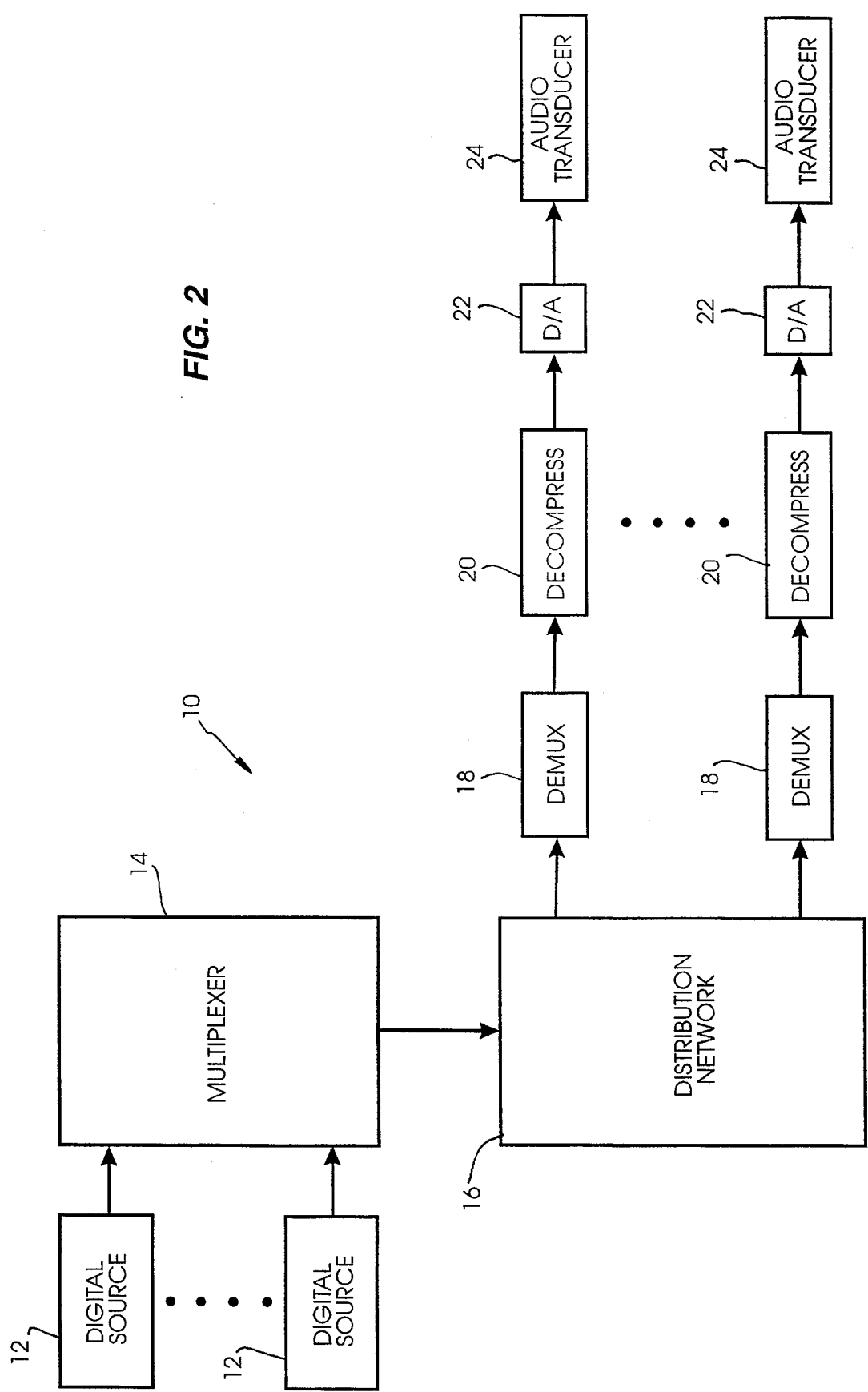
FIG. 2 is a block diagram illustrating the basic components comprising an improved audio signal distribution in accordance with the present invention.

Turning now to the drawings, FIG. 2 is a block diagram illustrating the basic components of a digital audio signal distribution system 10 in accordance with one form of the present invention. As shown, the digital audio signal distribution system 10 comprises a plurality of "true" digital signal sources 12, a multiplexer 14, a signal distribution network 16, a plurality of demultiplexers 18, a plurality of decompression circuits 20, a plurality of digital-to-analog converters 22, and a plurality of audio transducers 24.

Each digital audio signal source 12 may comprise, for example, a compact disc player, Model No. RD-AX7091, manufactured and sold by Matsushita Electronics Industrial Co., Ltd., of Osaka, Japan. Further, in a preferred form each digital audio signal source 12 is capable of receiving a plurality of clock and enable signals from the multiplexer 14 and, in response to those signals, generating a compressed digital audio signal output having a 4-bit sample size and a 37.8 kHz sampling rate. More specifically, prior to being stored on a compact disc (or other digital media), digital audio data is compressed from a 16-bit format to a 4-bit, compact disc interactive (CD-I), level B format by adaptive delta pulse code modulation (ADPCM). ADPCM compression and the CD-I level B format are well known in the art and, thus, they will not be discussed in further detail herein.

In a preferred form, each of as many as six digital signal sources 12 provides eight channels (4 stereo, or 8 mono) of compressed digital audio data to the multiplexer 14. Upon receiving the compressed digital audio channels from the digital audio signal sources 12, the multiplexer 14 time domain multiplexes (combines) the received compressed digital audio signals to form a single composite audio signal. In a preferred form, the composite audio signal has a transfer rate of 19.3536 MHz. The multiplexer 14 delivers the composite audio signal to the signal distribution network 16, and the signal distribution network 16 carries the composite audio signal to a plurality of remote locations, such as passenger seats, where one or more demultiplexers 18 are disposed. Each demultiplexer 18, under the control of a digital passenger control unit (DPCU) 134 (shown in FIG. 3), selects one or more desired channels from the composite signal and provides each selected channel to a decompression circuit 20. Each decompression circuit 20 decompresses the channel (signal) delivered thereto and provides the resulting expanded digital signal to a digital-to-analog (D/A) converter 22. Each of the digital-to-analog converters 22 converts the signal delivered thereto to an analog audio signal which is passed on to an audio transducer 24. Finally, each audio transducer converts the analog audio signal delivered thereto to sound waves.

As set forth above, because a passenger entertainment system 10 in accordance with the present invention performs only a single digital-to-analog conversion on each selected channel, substantial immunity to background noise, crosstalk, and the like is achieved. Moreover, the only digital-to-analog signal conversion performed by a system 10 in accordance with the present invention is that required to convert a selected decompressed digital audio signal to a form usable by the audio transducer(s) 24. Further, by utilizing "true" digital audio signal sources 12 capable of providing compressed digital audio signals to the signal distribution network 16 via the multiplexer 14 and later decompressing those signals, the passenger entertainment system 10 of the present invention achieves far superior signal resolution than that which is achievable using the A/D conversion technique characteristic of prior art systems. More specifically, when the systems of the prior art convert the analog audio signals provided by conventional compact disc players to digital signals having, for example, an 8-bit sample size and a 20–30 kHz sampling rate, signal resolution (fidelity or quality) is sacrificed substantially. In contrast, when a digital audio signal having a 16-bit sample size and a 37.8 kHz sampling rate is compressed to produce a digital signal having, for example, a 4-bit sample size and the same sampling rate, signal degradation is encountered, but only to a very small degree. In essence, digital signal compression yields close to a 4-to-1 reduction in the volume of data to be transported over the signal distribution network without incurring a noticeable degradation in sound quality.

Passenger Entertainment System Overview

Figure 3:
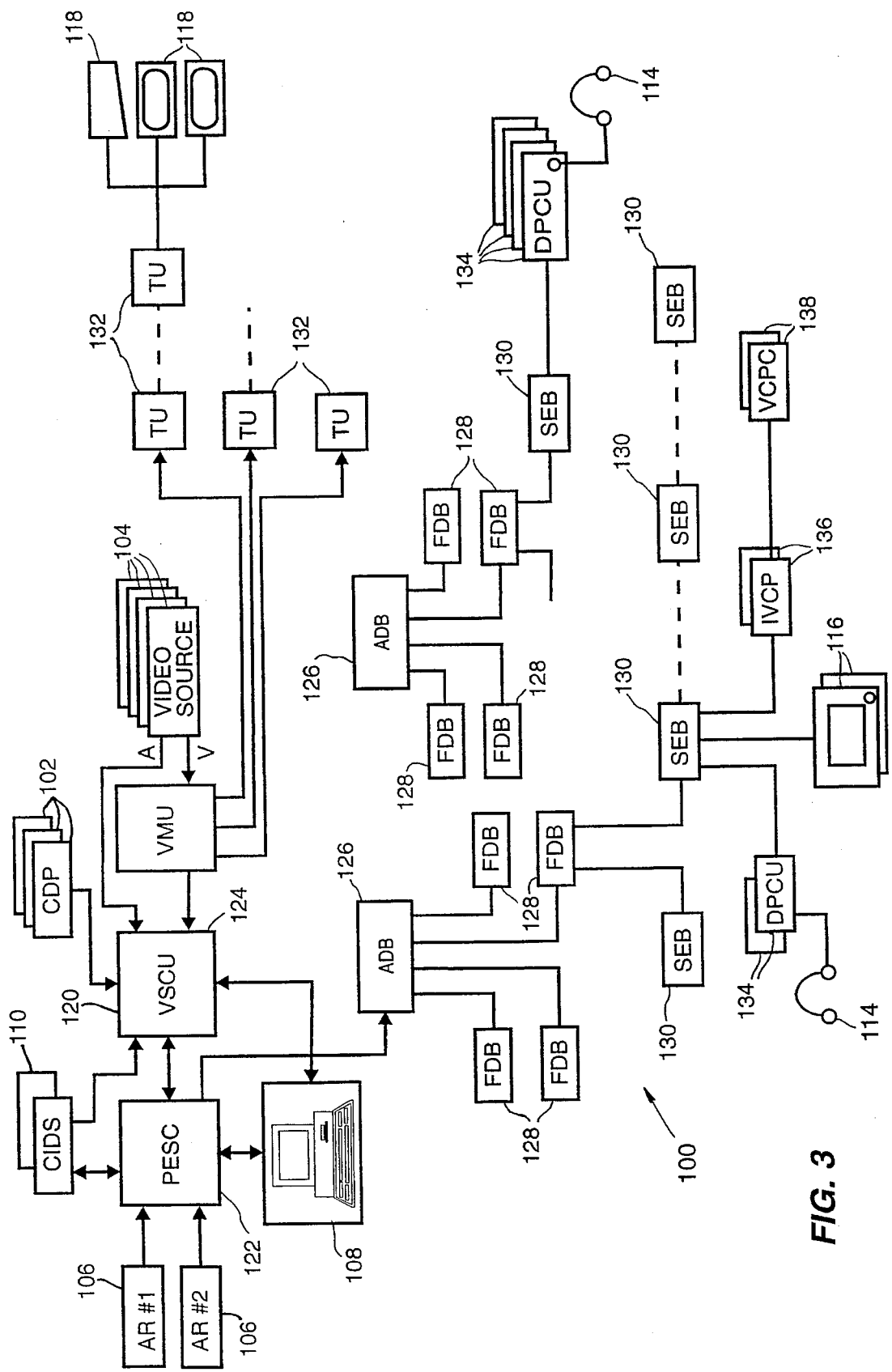
FIG. 3 is a block diagram illustrating the components comprising a preferred embodiment of an improved passenger entertainment system in accordance with the present invention.

Turning now to FIG. 3, in a preferred form a passenger entertainment system 100 in accordance with a preferred form of the present invention may comprise a mix of audio, video, and control signal sources including a plurality of true digital audio signal sources 102, a plurality of video signal sources 104, one or more analog audio signal sources 106, a cabin management terminal 108, and a cabin intercommunications data system (CIDS) 110. These audio, video, and control signal sources 102–110 are connected to each other and to a plurality of remotely located audio headsets 114, in-seat video monitors 116, and overhead video monitors 118 via a combined audio and video signal distribution system comprising a video system control unit (VSCU) 120, a passenger entertainment system controller (PESC) 122, a video modulator unit (VMU) 124, a plurality of area distribution boxes (ADBs) 126, a plurality of floor disconnect boxes (FDBs) 128, a plurality of seat electronics boxes (SEBs) 130, a plurality of tapping units (TUs) 132, a plurality of digital passenger control units (DPCUs) 134, a plurality of inseat video cassette players (IVCPs) 136, and a plurality of video cassette player controllers (VCPCs) 138. Many of the above identified signal sources 102–110 and signal distribution system components 120–138 will be discussed in more detail below. However, it is believed that the following general discussion will prove helpful in gaining a full understanding of the structure and function of an improved passenger entertainment system 100 in accordance with the present invention.

As set forth above in the section entitled "Digital Audio Signal Distribution System," it is presently preferred that each of the plurality of digital audio signal sources comprise a compact disc player, Model No. RD-AX7091, manufactured and sold by Matsushita Electronics Industrial Co., Ltd., of Osaka, Japan. It is preferred, also, that each of the digital audio signal sources 102 be capable of providing a compressed digital audio signal output comprising eight (8) channels (4 stereo or 8 mono) and having a 4-bit sample size and a 37.8 kHz sampling rate. Moreover, any compact disc player (CDP), digital audio tape player (DAT), or other digital audio signal source 102 capable of generating a digital output signal comprising eight (8) channels in a compact disc interactive (CD-I) level B format and capable of synchronizing to the frame format utilized by the system via provided control signals (i.e. clock and enable signals) may be used in accordance with the preferred form of the present invention.

Each of the compressed digital audio signals generated by the digital audio signal sources 102 is delivered to a separate input (not shown) of the video system control unit (VSCU) 120. The structure and function of the video system control unit 120 is described in detail in the section entitled "VSCU Structure and Function" below. However, at this point it should be understood that a multiplexer (not shown) disposed within the video system control unit 120 time domain multiplexes the compressed digital audio signals delivered thereto and produces a composite pulse code modulated (PCM) data signal. The composite PCM data signal is then delivered to a filter/combiner 312 (shown in FIG. 5) for combination with a composite RF video signal received from the video modulator unit (VMU) 124, and the resulting composite PCM/RF video signal is delivered to the passenger entertainment system controller (PESC) 122.

In a preferred form, the passenger entertainment system controller (PESC) 122 performs a second multiplexing operation which adds an additional twenty-four (24) entertainment channels and six (6) passenger address channels to the composite PCM/RF video signal. More specifically, the passenger entertainment system controller (PESC) 122 separates the composite PCM data/RF video signal into its respective PCM data and RF video components. The additional data channels are added to the PCM data portion of the separated signal and then the PCM data and RF video portions of the composite signal are recombined for further transmission.

Next, the composite PCM/RF video signal is delivered from the passenger entertainment system controller (PESC) 122 to a plurality of area distribution boxes (ADBs) 126. The area distribution boxes (ADBs) 126 are arranged in a daisy-chain configuration, and it is presently preferred to provide a maximum of eight area distribution boxes along each daisy-chain. However, those skilled in the art will recognize that additional area distribution boxes 126 may be provided depending, for example, upon the type of coaxial cable (not shown) which is used to connect the area distribution boxes (ADBs) 126. Each area distribution box 126 taps off a small portion of the composite PCM/RF video signal. Then, the tapped composite PCM/RF video signal is amplified and split such that the composite PCM/RF video signal may be distributed to a plurality of floor disconnect boxes (FDBs) 128. It may be noted that a separate signal is provided to each floor disconnect box (FDB) 128.

Each floor disconnect box (FDB) 128 acts as a signal splitter which services two daisy-chains of seat electronics boxes (SEBs) 130. It is presently preferred that each floor disconnect box 128 support a maximum of thirty (30) seat electronics boxes (SEBs) 130 with a maximum of fifteen (15) seat electronics boxes (SEBs) 130 being disposed in any given daisy-chain. However, it will again be noted that the number and specific configuration of the seat electronics boxes (SEBs) 130 may be varied from system to system.

Each seat electronics box (SEB) 130 may include a directional tap 702, a band splitting filter 704, a demultiplexer 706, a decompression circuit 708, and a plurality of video processing circuits 714 and 716 (all shown in FIG. 9) depending upon the features (audio or video) provided at a given passenger seat location. The directional tap 702 functions to tap off a small portion of the composite PCM/RF video signal for use within the seat electronics box (SEB) 130 and to pass the composite PCM/RF video signal with only a small amount of loss to the next seat electronics box (SEB) 130 in a given daisy-chain. The band splitting filter 704 separates the tapped composite PCM/RF video signal into its respective PCM data and RF video components. The RF video component is delivered to a tuner 714 of each of the video processing circuits, and the PCM data signal is delivered to the demultiplexer (IVAS gate array) 706 via a linear analog amplifier 730 and an amplitude comparator 732. The demultiplexer 706, under the control of one of a plurality of digital passenger control units (DPCUs) 134, selects one or more desired channels from the composite PCM data signal and provides each selected channel to a decompression circuit 708 (ADPCM gate array shown in FIG. 9). Each decompression circuit 708, in turn, decompresses the channel(s) delivered thereto and provides the resulting expanded digital audio signal to a pair of digital-to-analog (D/A) converters 710. The digital-to-analog converters 710 convert the expanded digital audio signals to analog signals. The resulting analog audio signals are amplified by an amplifier 712 and delivered to a transducer (not shown) disposed in, for example, a passenger headphone 114.

Figure 9:
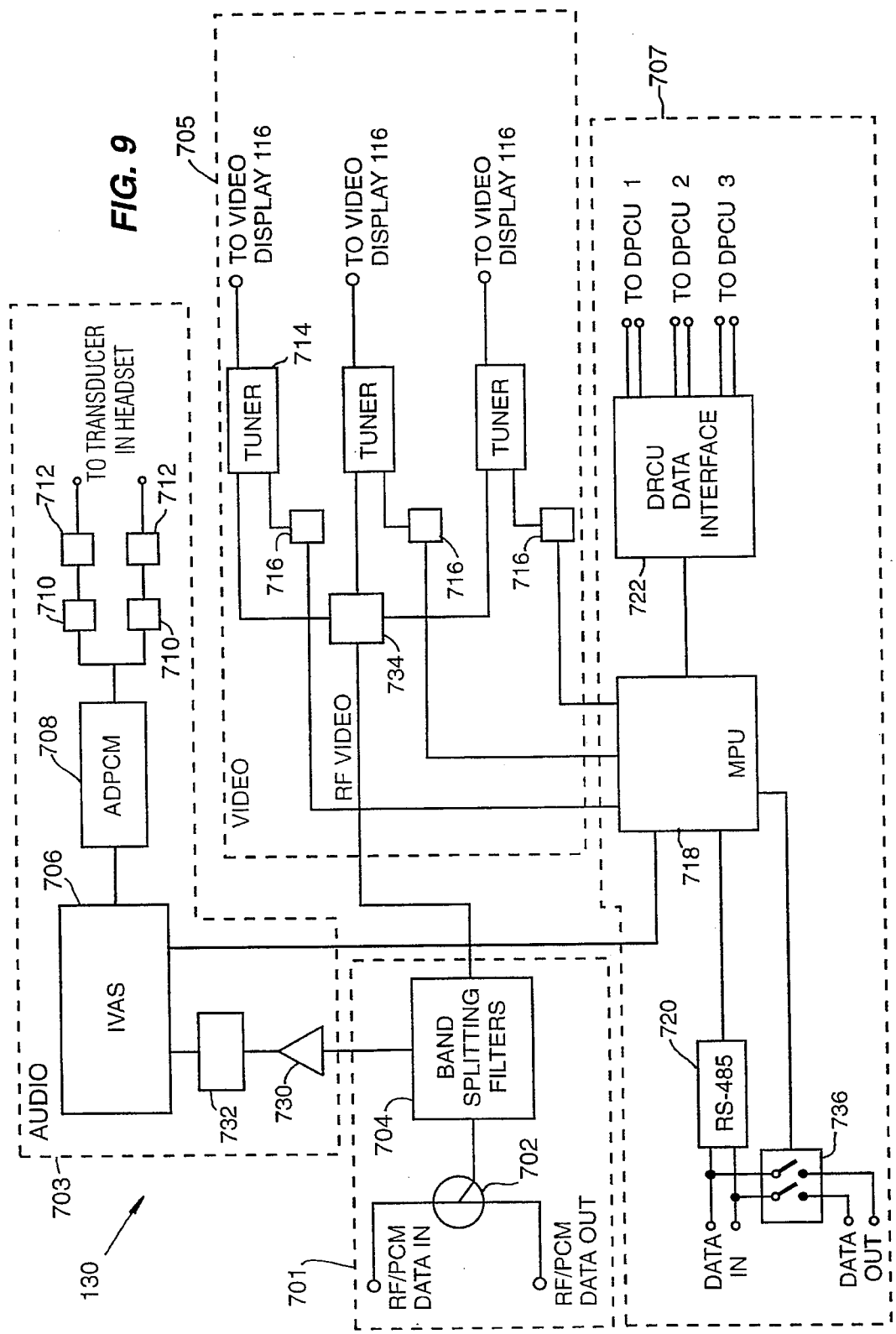
FIG. 9 is a block diagram of the circuitry comprising a seat electronics box (SEB) in accordance with a preferred form of the present invention.

The RF video portion of the split signal is delivered to a plurality of video processing circuits each comprising a tuner 714 and a tuner control circuit 716 via a signal splitter 734 (all of which are shown in FIG. 9). The signal splitter 734 functions to isolate the individual tuners 714 from one another, and the tuner control circuits 716 are controlled via a microprocessing unit (MPU) 718 and one of a plurality of digital passenger control units (DPCUs) 134. Each tuner 714 is controlled by an associated video control circuit 716 which receives control signals from the microprocessing unit 718, and each tuner 714 is capable of selecting a desired video channel from the composite RF video signal. After a particular video channel is selected, the video processing circuit delivers that channel to a seat display unit (SDU) 116 for display.

The in-seat video cassette players (IVCPs) 136 are controlled by the video cassette player controllers (VCPCs) 138 and provide an additional source of video signals for display on the seat display units (SDUs) 116. In a preferred form, the inseat video cassette players (IVCPs) 136 may comprise, for example, Part No. RD-AV1203, manufactured and sold by Matsushita Electronics Industrial Co., Ltd., of Osaka, Japan. The in-seat video cassette players (IVCPs) 136 are controlled in a conventional fashion by the video cassette player controllers (VCPCs) 138, and when enabled, provide analog audio and video signals which are passed through the seat electronics box (SEB) to a seat display unit (SDU) 116 and passenger headset (not shown).

VMU Structure and Function

Figure 4:
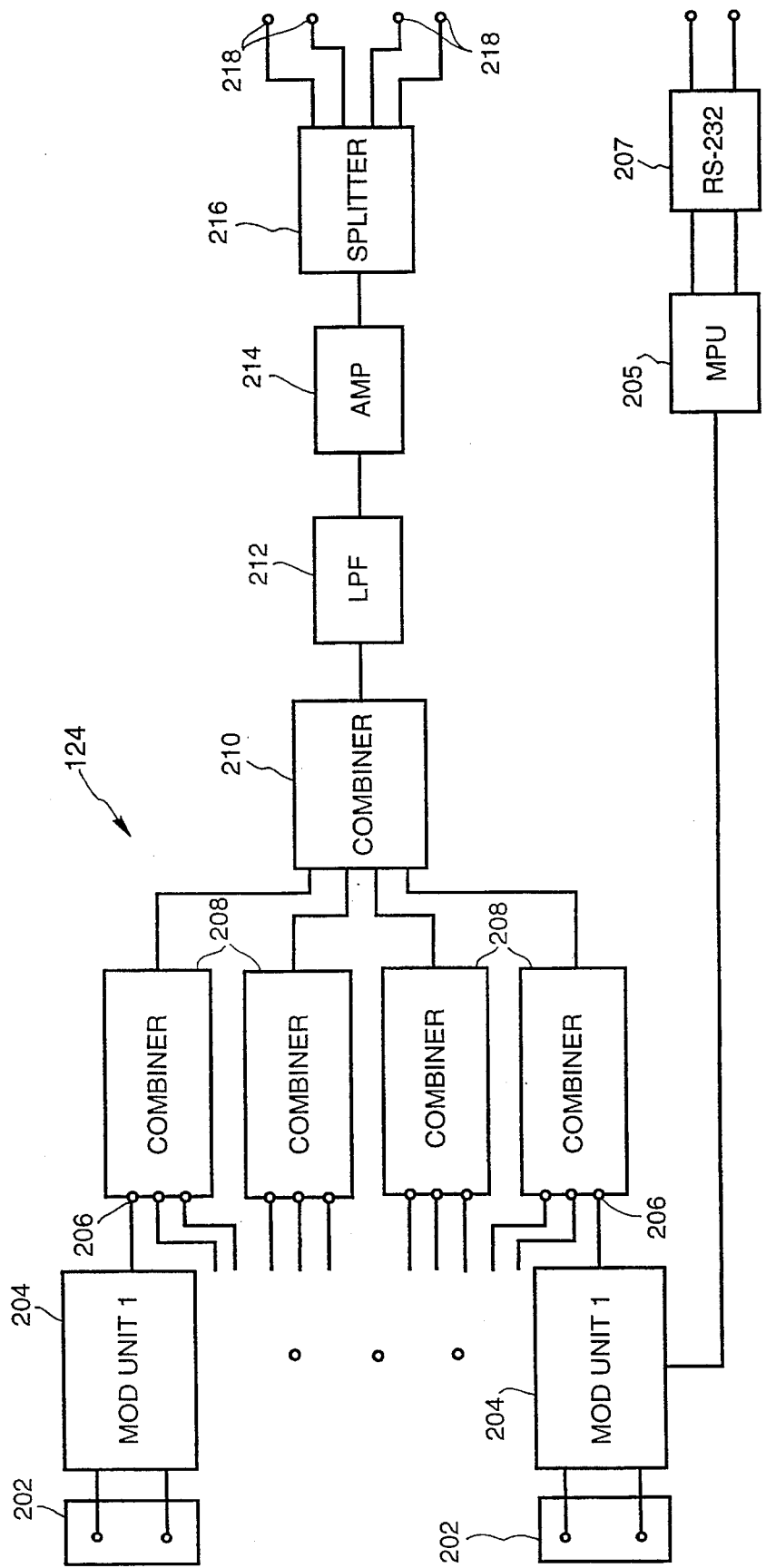
FIG. 4 is a block diagram illustrating the components comprising a video modulator unit (VMU) in accordance with a preferred form of the present invention.

Turning now to FIG. 4, in a preferred form the video modulator unit (VMU) 124 receives at separate balanced input ports 202 a plurality of analog video signals generated by the video signal sources 104. Each of the analog video signals delivered to the video modulator unit 124 is provided to an amplitude modulator 204 disposed within the video modulator unit 124, and the amplitude modulators 204 modulate each of the supplied video signals on a selected carrier frequency. It is believed that amplitude modulation is well known in the art and, thus, it will not be discussed in further detail herein. However, it may be noted that it is presently preferred to modulate each supplied video signal on a selected carrier frequency between 135 MHz and 300 MHz. Further, each modulator 204 is electronically coupled to and controlled by a micro-processing unit (MPU) 205. The micro-processing unit (MPU) 205 provides a means for varying the operating parameters of the modulator units 204 and, in doing so, provides a means for programmably selecting desired carrier frequencies. More specifically, the micro-processing unit (MPU) 205 communicates with a central processing unit (CPU) 316 (shown in FIG. 5) disposed within the video system control unit (VSCU) 120 via an RS-232 interface 207, and the micro-processor 205 sets the carrier frequencies in response to signals received from the video system control unit (VSCU) 120. It is presently preferred to set each carrier frequency to a default frequency (between 135 MHz and 300 MHz), absent circumstances which dictate otherwise. Presently preferred default frequencies are set forth in TABLE 1 below.

TABLE 1

| Channel | Frequency | Channel | Frequency |
|---|---|---|---|
| NORMAL CHANNELS | | | |
| 01 | 151.25 MHz | 07 | 223.25 MHz |
| 02 | 163.25 MHz | 08 | 235.25 MHz |
| 03 | 175.25 MHz | 09 | 247.25 MHz |
| 04 | 187.25 MHz | 10 | 259.25 MHz |
| 05 | 199.25 MHz | 11 | 271.25 MHz |
| 06 | 211.25 MHz | 12 | 283.25 MHz |
| PREVIEW CHANNELS | | | |
| PR1 | 139.25 MHz | PR2 | 295.25 MHz |

It should be noted, however, that it is not intended to limit the scope of the present invention to the particular carrier frequencies listed above, as those frequencies merely comprise preferred carrier frequencies. Moreover, as set forth above, it is preferred that the carrier frequencies utilized by the passenger entertainment system 100 of the present invention be programmable, such that if, for example, interference is encountered at a particular frequency, that frequency may be changed by entering a new carrier frequency into a database stored in memory at the cabin management terminal 108. The carrier frequency of a particular modulator 204 may also be varied in the event that a particular video input signal is not available (i.e. in the event that a particular video source 104 becomes inoperative). For example, if a particular video recording is to be broadcast upon channel 1, and the video source 104 feeding channel one becomes inoperative, the video recording may be played by another video source 104 and the modulator coupled to that source may be configured, as set forth above, to modulate the signal delivered thereto up to 151.25 MHz (the carrier frequency of channel 1).

After modulation, each video signal is delivered to a separate input 206 of one of a plurality of primary combiner circuits 208. Each primary combiner circuit 208 combines three video input signals to form a combined video signal, and each resulting combined signal is delivered to one input of a secondary combiner circuit 210. The signal produced by the secondary combiner circuit 210 is referred to herein as the composite RF video signal.

Prior to being distributed throughout the passenger entertainment system 100, the composite RF video signal is passed through a low pass filter 212, amplified by an amplifier 214, and split by a 4-way splitter 216. Thus, in a preferred form the composite RF video signal is provided to four separate output terminals 218 of the video modulator unit (VMU) 124.

Referring now also to FIG. 3, the video modulator unit (VMU) 124 is coupled to a plurality of tapping units (TUs) 132 which are, in turn, coupled to a plurality of video projectors or video monitors 118. Each tapping unit (TU) 132 may comprise, for example, a TU Model No. RD-AA5101, presently manufactured and sold by Matsushita Electronics Industrial Co., Ltd., of Osaka, Japan. Further, each tapping unit 132 comprises a video tuner (shown in FIG. 4(a)) for selecting a desired channel from the composite RF video signal, and each tapping unit 132 is capable of driving up to three (3) different video monitors or projectors 118 (all displaying the same channel). Although the tapping units 132 receive the composite RF video signal from the video modulator unit 124, the tapping units 132 are controlled by the central processing unit (CPU) 316 (shown in FIG. 5) disposed within the video system control unit (VSCU) 120. More specifically, the central processing unit (CPU) 316 disposed within the video system control unit (VSCU) 120 controls the selection of channels by the tapping units 132, as well as, the function of the video monitors or projectors 118.

Tapping Unit Structure and Function

Figure 4A:
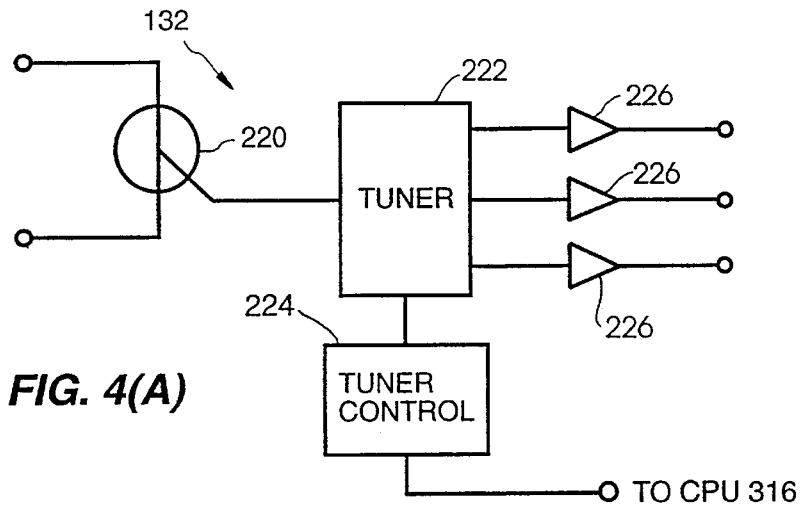
FIG. 4(a) illustrates the circuitry comprising a tapping unit in accordance with a preferred form of the present invention.

Turning now also to FIG. 4(a), each tapping unit 132 comprises a directional tap 220, a tuner 222, a turner control circuit 224, and three video signal amplifiers 226. The directional tap 222 functions to tap off a small portion of the composite RF video signal generated by the video modulator unit 124 and to pass the remaining portion of the composite RF video signal to the next tapping unit 132 along a given daisy-chain with only a small amount of signal loss. The tuner control circuit 224 is coupled to the central processing unit 316 disposed within the video system control unit (VSCU) 120 and, in response to signals received therefrom, controls the tuner 222. The tuner 222 selects a desired channel for viewing the video monitors 118 in response to signals received from the tuner control circuit 224 and delivers the selected channel to the amplifiers 226.

VSCU Structure and Function

Figure 5:
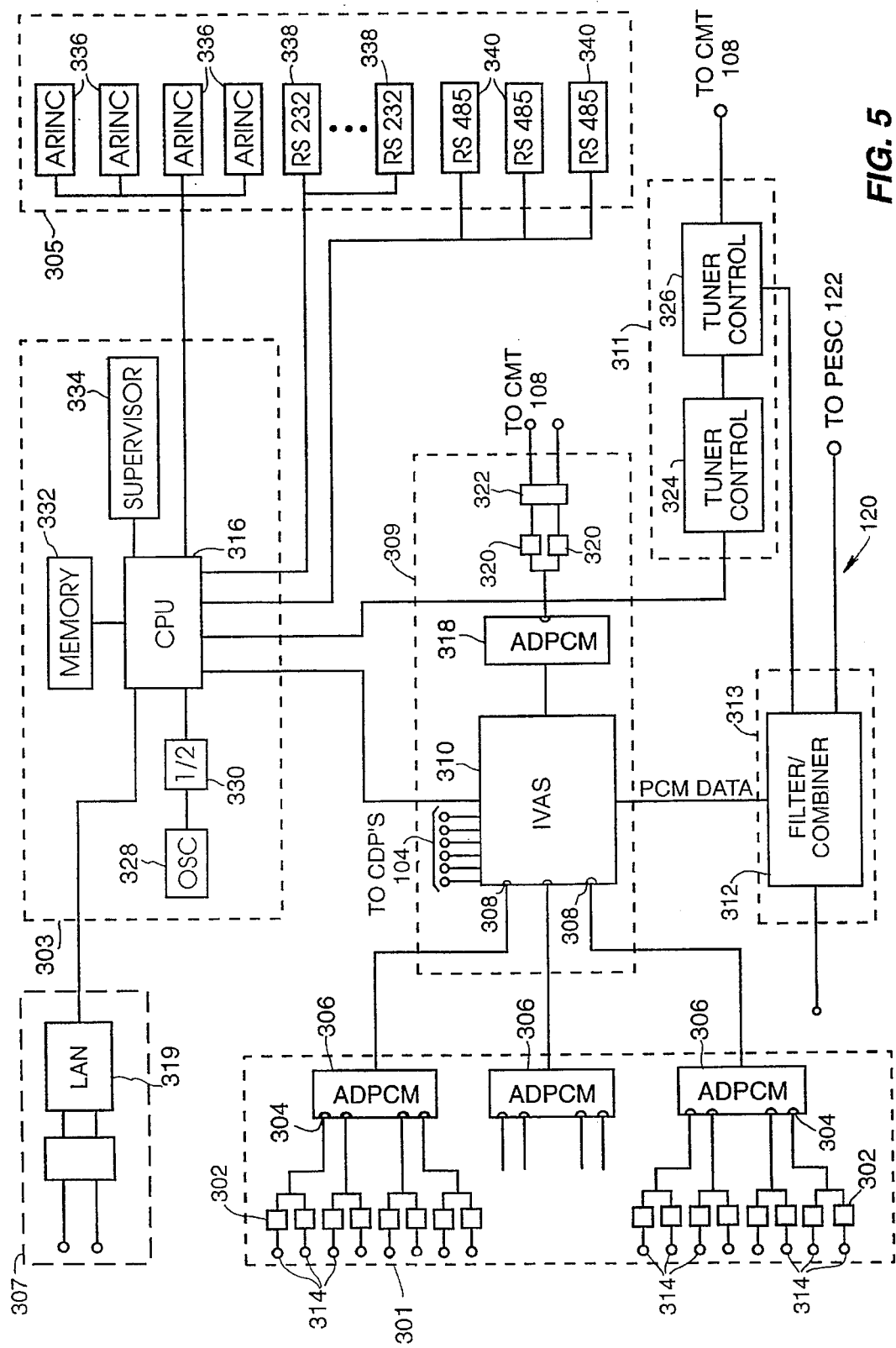
FIG. 5 is a block diagram illustrating the circuitry comprising a video system control unit (VSCU) in accordance with a preferred form of the present invention.

Turning now to FIG. 5, in a preferred form the video system control unit (VSCU) 120 of the present invention provides the central control function for the audio and video portions of a passenger entertainment system 100 in accordance with the present invention. Moreover, the video system control unit (VSCU) 120 receives database and program selection information from the cabin management terminal (CMT) 108 and, based on that information, provides control signals to the video signal sources 104, the digital audio signal sources 102, the video modulator unit (VMU) 124, and a plurality of tapping units (TUs) 132.

In addition to providing the central control function for a passenger entertainment system 100 in accordance with a preferred form of the present invention, the video system control unit (VSCU) 120 receives and multiplexes all video sourced audio signals generated by the video signal sources 104 and all compressed digital audio signals provided by the digital audio signal sources 102. The signal which results upon completion of the multiplexing operation performed by the video system control unit (VSCU) 120 is referred to herein as the composite PCM data signal.

The video system control unit (VSCU) 120 distributes the composite PCM data signal to a plurality of remote locations via the passenger entertainment system controller (PESC) 122, a plurality of area distribution boxes (ADBs) 126, a plurality of floor disconnect boxes (FDBs) 128, and a plurality of seat electronics boxes (SEBs) 130.

In a preferred form the video system control unit (VSCU) 120 is capable of accepting up to forty-eight (48) compressed digital audio channels from a plurality of compact disc players (CDPs) 102 (eight channels per player) and up to forty-eight (48) analog audio channels from a mix of video cassette players 104 (four channels per player) and analog audio reproducers 106 (twelve channels per player), to a maximum of seventy-two (72) channels total. More specifically, the video system control unit (VSCU) 120 is configured to accommodate three blocks of input channels comprising twenty-four (24) channels each, and a given block of input channels may comprise channels of only one type (i.e. either compressed digital audio channels or analog audio channels). Accordingly, in the preferred form the video system control unit may be configured to accommodate either twenty-four (24) analog audio channels and forty-eight (48) compressed digital audio channels or forty-eight (48) analog audio channels and twenty-four (24) compressed digital audio channels for a maximum of seventy-two (72) channels total.

The analog audio channels received from the audio reproducers 106 and video sources 104 are converted to a digital format having a 16-bit sample size using analog-to-digital converters 302, and the resulting digital signals are then compressed to a format having a 4-bit sample size by adaptive delta pulse code modulation. In a preferred form, the analog-to-digital conversion process is performed by one of up to forty-eight (48) MASH (Multi-Stage Noise Shaping) analog-to-digital converters 302 (twenty-four per analog audio board 301). Each MASH analog-to-digital converter 302 is capable of receiving a single analog input signal, converting that signal to a digital format, and multiplexing the resulting digital signal with another converted digital signal (i.e. a signal from another MASH analog-to-digital converter 302) to form a single digital output signal having two channels. MASH conversion is well known in the art and, therefore, it will not be discussed in further detail herein. Further, in a preferred form the MASH converters may comprise MASH DAC chips Part No. MN6460A sold by Matsushita Electronics Corp. of Osaka, Japan. After the MASH analog-to-digital signal conversion process is completed, the resulting digital signals comprising two channels each are delivered to separate input terminals 304 of a plurality of ADPCM gate arrays 302. It is presently preferred to utilize three (3) ADPCM gate arrays 306, each being coupled to eight (8) separate MASH analog-to-digital converters 306. The four (4) digital signals comprising two (2) channels each, which are received by each ADPCM gate array 306, are compressed by adaptive delta pulse code modulation and then multiplexed to form a single compressed digital output signal having eight channels. The resulting three (3) compressed digital output signals are then delivered from the ADPCM gate arrays 306 to separate inputs 308 of an integrated video audio system (IVAS) gate array 310.

The integrated video audio system (IVAS) gate array 310, in turn, combines the compressed digital audio signals generated by the digital audio signal sources 102 with the compressed digital output signals generated by the ADPCM gate array 310 to form the composite PCM data signal. The function of the IVAS gate arrays 306 is discussed in more detail below. However, at this point it is sufficient to understand that the integrated video audio system (IVAS) gate array 310 time domain multiplexes the compressed digital audio signals received from the digital audio signal sources 102 and the converted and compressed signals received from the ADPCM gate arrays 310 to form a composite pulse code modulated (PCM) data signal. The integrated video audio system (IVAS) gate array 310 then delivers the composite PCM data signal to a filter/combiner 312 which combines that signal with a composite RF video signal provided by the video modulator unit (VMU) 124. The filter (not shown) in the filter/combiner 312 reduces the amplitude of the composite PCM data signal and shapes the resulting waveform so as to create an analog waveform similar in frequency and other characteristics to a modulated radio frequency (RF) signal. In doing so, the composite PCM data signal is converted to a form which may be passed through the passive signal processing components (i.e. directional taps, splitters, and the like) as well as the linear analog amplifiers disposed within the area distribution boxes (ADBs) 126 and floor disconnect boxes (FDBs) 128. The combiner (not shown) of the filter/combiner 312 combines the filtered composite PCM data signal with the composite RF video signal to form a composite PCM/RF video signal. The resulting composite PCM/RF video signal is then delivered to the passenger entertainment system controller (PESC) 122 for further processing and, ultimately, distribution to the remote seat locations.

As further illustrated in FIG. 5, in a preferred form the video system control unit (VSCU) 120 may comprise as many as nine (9) subsystem boards including: two analog signal conversion boards 301; a central processing unit (CPU) board 303; an ARINC interface board 305; a local area network (LAN) board 307; a digital audio board 309; a tuner board 311; a power supply board (not shown); and a mother board 313. For convenience, dashed lines are utilized herein to indicate which circuit components reside on a given subsystem board.

Each audio signal conversion board 301 comprises twenty-four (24) audio signal input ports 302, twenty-four (24) MASH analog-to-digital converters 314, and three ADPCM gate arrays 306. The audio signal input ports 314 receive analog audio signals from a plurality of video sources 104 and audio reproducer units 106 and, in turn, pass those signals on to the MASH analog-to-digital converters 302. The MASH analog-to-digital converters 302 each convert a single incoming analog audio signal to a digital audio signal, and pairs of resulting digital audio signals are multiplexed to form a single digital output signal comprising two (2) channels and having a 16-bit sample size and a 37.8 kHz sampling rate. Each of the converted audio signals comprising two (2) channels is then delivered to an input terminal 304 of one of three (3) ADPCM gate arrays 306, where it is compressed and combined with three other converted audio signals to form a compressed digital output signal having eight (8) channels. Each of the three (3) ADPCM gate arrays 306 generates a separate compressed digital output signal, and each of the three (3) compressed digital output signals is then delivered to the digital audio board 309 whereon the integrated video audio system (IVAS) gate array 310 is disposed.

The integrated video audio system (IVAS) gate array 310 disposed on the digital audio board 309 receives compressed digital audio signals from the digital audio signal sources 102 and the ADPCM gate arrays 306 and multiplexes those signals to produce the composite PCM data signal referred to above. The composite PCM data signal is then provided to the filter/combiner 312 of the mother board.

As discussed more fully below, the integrated video audio system (IVAS) gate array 310 of the digital audio board 309 also functions as a channel selector or demultiplexer. More specifically, the integrated video audio system (IVAS) gate array 310 may be utilized to select preview audio channels for listening at the cabin management terminal 108. In this mode, the integrated video audio system (IVAS) gate array 310 in response to control signals generated by the central processing unit (CPU) 316 selects the desired audio channel(s) (1 for mono or 2 for stereo) from the composite PCM data signal. The selected audio channels, which comprise compressed digital audio data, are delivered to an ADPCM gate array 318 for decompression to a 16-bit format and then passed to a pair of MASH digital-to-analog converters 320 (preferably MASH DAC chips Model No. MN6475A sold by Matsushita Electronics Corp. of Osaka, Japan) for separation (i.e. demultiplexing) and conversion to an analog format. The resulting analog preview channels are then delivered to a gain control circuit 322 and, finally, to the cabin management terminal 108 for listening via an audio transducer disposed in, for example, a stereophonic headset (not shown).

The tuner board comprises tuner control circuitry 324 and a tuner circuit 326. The tuner circuit 326 receives the composite RF video signal generated by the video modulator unit (VMU) 124 and, in response to control signals generated by the central processing unit 316, is capable of selecting a preview video channel from the composite RF video signal. More specifically, the tuner control 324 receives control signals from the central processing unit (CPU) 316 and, in response thereto, adjusts the operating parameters of the tuner 326 to select a desired RF video channel. Referring back to TABLE 1, in a preferred form the carrier frequency of the channel to be previewed is set to either 139.25 MHz or 295.25 MHz and, thus, the tuner 326 is also set to select either a frequency of 139.25 MHz or 295.25 MHz depending upon which preview carrier frequency is utilized. Finally, the selected RF video channel is demodulated by the tuner 326 and passed to the cabin management terminal 108 for viewing. In this fashion, channels may be previewed prior to distribution throughout the passenger entertainment system 100. If, on the other hand, it is desired to merely monitor a video channel, the carrier channel of that video channel may be selected by the tuner 326 in the manner set forth above, and the channel to be monitored will be passed to the cabin management terminal 108 for viewing.

The CPU board comprises a central processing unit 316 (preferably a 68,000 series micro-processor of the type manufactured by Motorola, Inc. of Phoenix, Ariz., Part No. MC68HC000RC16), a crystal controlled oscillator 328 having a crystal frequency of 19.66 MHz, a frequency divider circuit 330, a plurality of memory components 332, and a microprocessor supervisor circuit 334.

The central processing unit 316 performs a number of functions including initialization, sub-system control, and sub-system communications management. Chip initialization is accomplished by writing programming commands to peripheral chips to control the mode of operation of those chips. It may be noted that, as part of performing the initialization function, the central processing unit 316 must receive a system configuration database from the cabin management terminal (CMT) 108.

Communication between the central processing unit (CPU) 316 and other peripheral devices (or sub-systems) is implemented as follows. The central processing unit (CPU) 316 communicates with the cabin management terminal (CMT) 108 via the local area network (LAN) 319 to obtain configuration information and execution commands used for controlling video system functions. The central processing unit (CPU) 316 communicates with the microprocessor 205 of the video modulator unit (VMU) 124 via an RS-232 interface 338 to control the frequencies of the modulators 204 disposed therein and to run diagnostic functions. The central processing unit (CPU) 316 communicate with the cabin intercommunications data system (CIDS) 110 over one of the ARINC-429 interfaces 336. The central processing unit (CPU) 316 controls selected video signal sources 104 via an RS-232 interface 338 which corresponds to the selected video signal source 104. More specifically, upon receiving commands to control certain functions of the video signal sources 104 from the cabin management terminal (CMT) 108, the central processing unit (CPU) 316 executes the commands by communicating with an appropriate video signal source 104 via the RS-232 interface 338 which corresponds to that video signal source 104. Communication between the central processing unit (CPU) 316 and the digital audio signal sources 102 is accomplished in a similar fashion. Finally, communications between the central processing unit (CPU) 316 and the video display units (VDUs) 118 and tapping units (TUs) 132 are carried over RS-485 interfaces 340.

The memory components 332 coupled to the central processing unit 316 comprise a pair of RAM memories (128K×8 each) for data storage, a pair of EPROMs (512K×8 each) for program storage, and a pair of EEPROMs (64K×8 each) for storing built in test equipment (BITE) information, configuration data, and a downloadable data base.

The microprocessor supervisor circuit 334 provides the reset line (not shown) of the central processing unit 316, and the primary function of the supervisor circuit 334 is to guarantee continuous system performance. More specifically, if the central processing unit 316 should become caught in an infinite loop, the supervisor circuit 334 will detect that condition and reset the central processing unit 316. In addition, the supervisor circuit 334 is capable of detecting potential power interruptions and failures. Thus, upon detecting a power interruption or failure, the supervisor circuit 334 signals the central processing unit 316, and the central processing unit 316 may begin an orderly shut down process or backup critical data.

The ARINC interface board 305 comprises four (4) ARINC-429 ports 336, nineteen (19) RS-232 ports 338, and three (3) RS-485 ports 340. The RS-232 ports 338 provide communication between the central processing unit 316 and the digital audio signal sources 102, the video sources 104, and the video modulator unit (VMU) 124. The RS-485 ports 340 provide communication between the central processing unit 316 and the tapping units (TUs) 132, and the ARINC-429 ports 336 provide communication between the central processing unit 316 and the cabin intercommunication data system (CIDS) 110.

PESC Structure and Function

Figure 6:
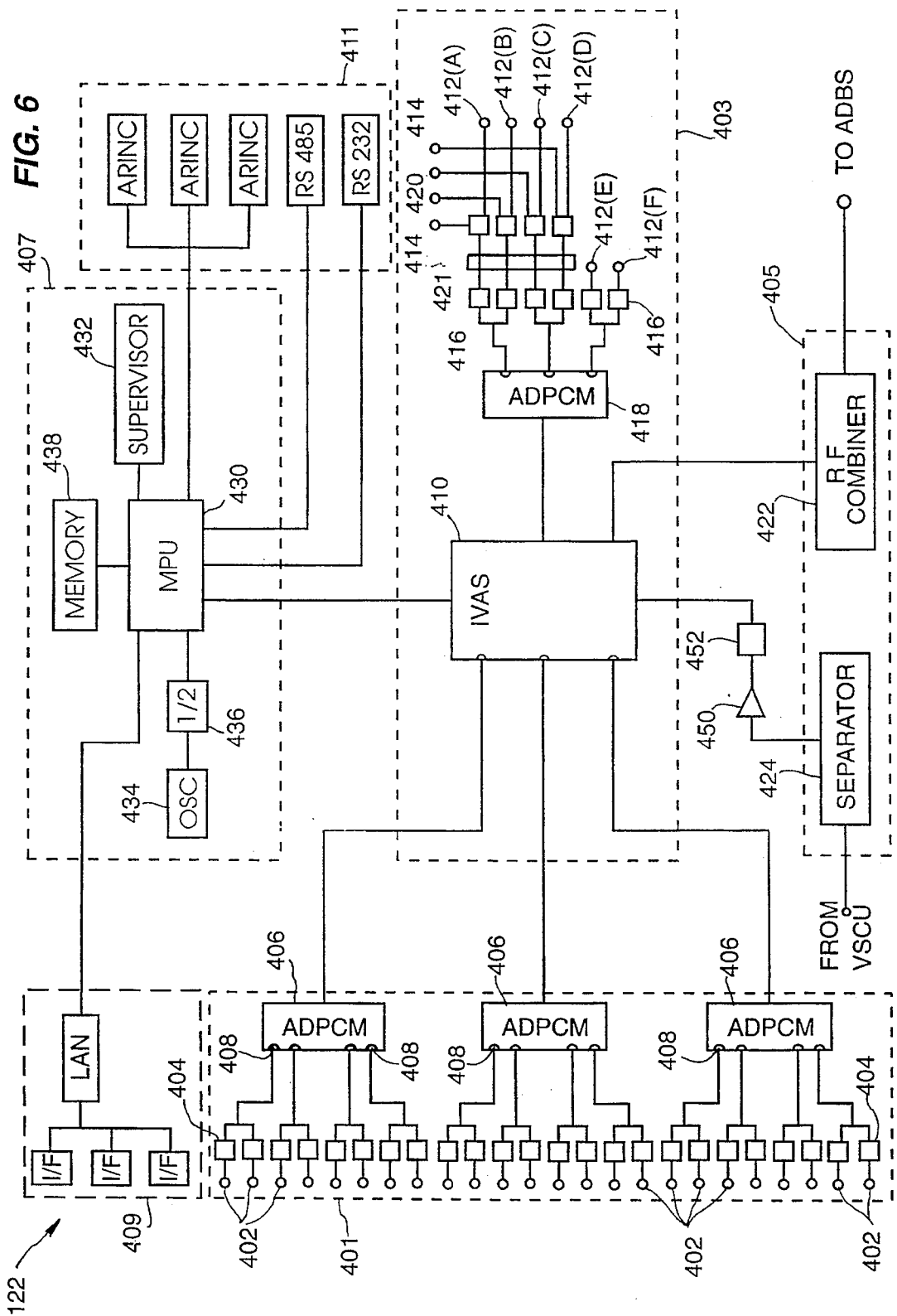
FIG. 6 is a block diagram illustrating the circuitry comprising a passenger entertainment system controller (PESC) in accordance with a preferred form of the present invention.

Turning now to FIG. 6, in a preferred form the passenger entertainment system controller (PESC) 122 comprises two (2) analog signal conversion boards 401 and 403, a mother board 405, a CPU board 407, a local area network (LAN) board 409, a power supply board (not shown), and an ARINC interface board 411. As in the case of the video system controller unit (VSCU) 120, dashed lines are utilized to indicate which circuit components are disposed on a given board.

The first analog signal conversion board 401 comprises the same components as the audio signal conversion boards 301 disposed in the video system control unit (VSCU) 120. More specifically, the first analog signal conversion board 301 comprises twenty-four (24) audio signal input ports 402, twenty-four (24) analog-to-digital MASH converters 404, and three ADPCM gate arrays 406. The audio signal input ports 402 receive analog audio signals from a plurality of audio reproducer units 106 and, in turn, pass those signals on to the MASH analog-to-digital converters 404. The MASH analog-to-digital converters 404 convert each incoming analog audio signal to a digital format, and pairs of the resulting digital signals are multiplexed to form a single digital audio signal comprising two (2) channels and having a 16-bit sample size and a 37.8 kHz sampling rate. Each of the converted audio signals is then delivered to an input terminal 408 of one of three (3) ADPCM gate arrays 406, where it is compressed and combined with three other converted audio signals to form a compressed digital output signal having eight (8) channels. Each of the three (3) ADPCM gate arrays 406 generates a separate compressed digital output signal, and each of the three (3) compressed digital output signals is then delivered to the second analog signal conversion board 403 whereon an integrated video audio system (IVAS) gate array 410 is disposed.

The second analog signal conversion board 403 comprises several of the components disposed on the first analog signal conversion board 401, as well as an integrated video audio system (IVAS) gate array 410. Moreover, the second analog signal conversion board comprises ten (10) audio signal input ports 412(a)–(f) and 414, six (6) MASH analog-to-digital converters 416, one ADPCM gate array 418, and an integrated video audio system (IVAS) gate array 410.

It is presently preferred to provide four (4) voice operated switch (VOX) passenger address (PA) audio channels and six (6) other PA audio channels to the audio signal input ports 412 and 414 of the second analog signal conversion board 403 of the passenger entertainment system controller (PESC) 122. However, only six (6) PA audio channels are passed to the MASH analog-to-digital converters 416 at any given time. More specifically, voice operated switching (VOX) circuits 420 detect the presence or absence of audio signals at the VOX PA input terminals 414 and provide control signals to a four channel (2 to 1) multiplexer 421 which selects between the VOX PA inputs 414 and the first four PA audio channels 412(a–d). Each channel of the multiplexer 421 is controlled by a separate VOX circuit 420, such that, when a VOX circuit 420 detects an audio signal at its input, a signal is conveyed to the multiplexer 421 prompting the multiplexer 421 to replace the PA audio input 412 with the VOX PA audio input 414.

The analog-to-digital MASH converters 416 and ADPCM gate array 418 function as described above and, thus, their function will not be discussed in further detail at this point.

The primary function of the IVAS gate array 410 of the passenger entertainment system controller (PESC) 122 is to add additional audio, control and passenger address signals to the composite PCM/RF video signal. More specifically, the IVAS gate array 410 time domain multiplexes the PCM data portion of the composite PCM/RF video signal, the compressed signals received from the ADPCM gate arrays 406 and 418, and CPMS/PSS data messages received from the microprocessor 430, thus adding the compressed signals delivered from the ADPCM gate arrays 406 and 418 and the CPMS/PSS data signals to the composite PCM data signal. The resulting "complete" composite PCM data signal is then delivered to a filter/combiner 422 for combination with the RF video signal, and the "complete" composite PCM/RF video signal is then passed from the RF combiner 422 to a plurality of area distribution boxes (ADBs) 124. It may be noted that the filter/combiner 422 of the passenger entertainment system controller 122 functions in the same manner as the filter/combiner 312 disposed within the video system control unit 120.

A separator 424 disposed on the mother board 405 of the passenger entertainment system controller (PESC) 122 separates the composite PCM/RF video signal delivered to it by the video system control unit (VSCU) 120 and provides the PCM data portion of that signal to the integrated video audio system (IVAS) gate array 410. The separator 424 performs the separation function based on frequency, such that all frequency elements below approximately 50 MHz are routed to the PCM audio board 403, while all frequency elements above approximately 100 MHz are routed through the RF video board 405. The RF video portion of the separated signal is provided by the separator 424 to the filter/combiner 422 for recombination with the PCM data signal.

The CPU board 407 of the passenger entertainment system controller (PESC) 122 comprises the same circuitry as does the CPU board 303 disposed in the video system controller unit (VSCU) 120. More specifically, the CPU board 407 comprises a microprocessor 430, a supervisor circuit 432, an oscillator 434, a frequency divider 436, and a plurality of memories 438. These components function in a similar fashion as those on the CPU board 303 of the video system control unit (VSCU) 120. However, they are configured to accommodate the functions of the passenger entertainment system controller (PESC) 122 which are set forth above.

ADB Structure and Function

Figure 7A:
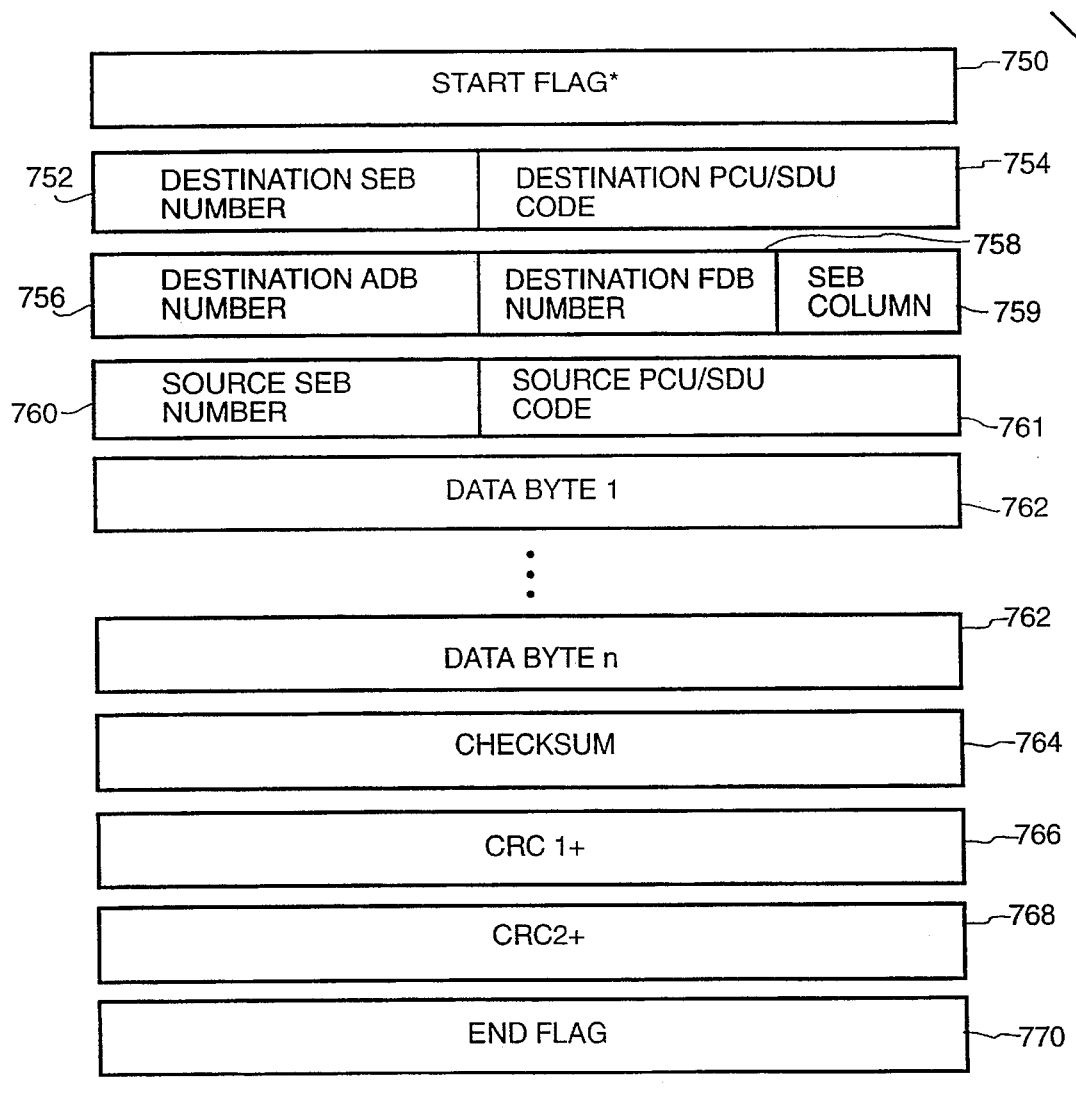
FIG. 7(a) illustrates the format of messages sent over a DATA 1 bus in accordance with a preferred form of the present invention.
Figure 7:
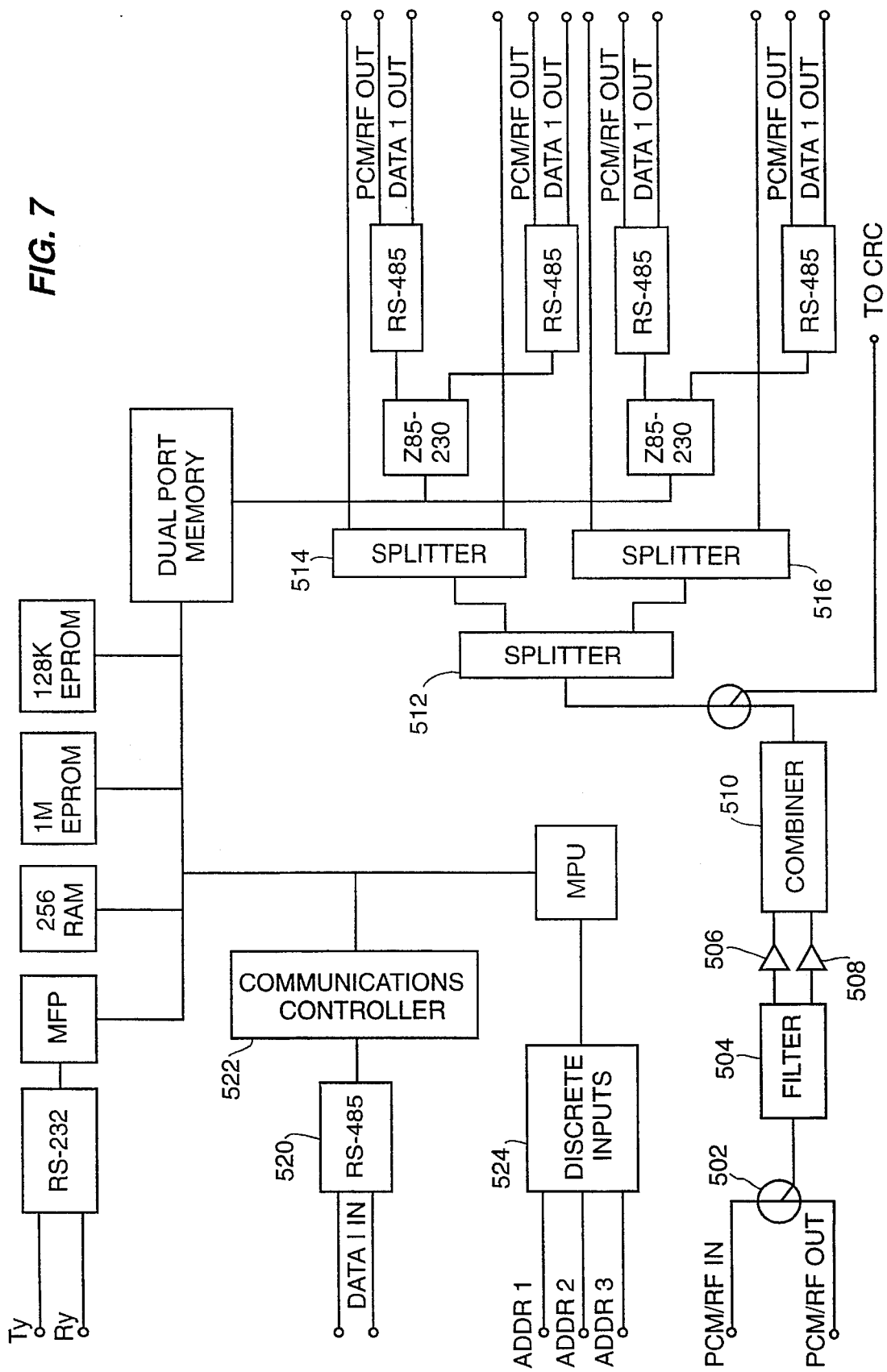
FIG. 7 is a block diagram of the circuitry comprising an area distribution box (ADB) in accordance with a preferred form of the present invention.

Turning now to FIG. 7, in a preferred form each area distribution box (ADB) 126 serves as a zone controller which distributes power, audio, video, and service data to a plurality of floor disconnect boxes (FDBs) 128. The area distribution boxes (ADBs) 124 are arranged in a daisy-chain configuration with a maximum of eight (8) area distribution boxes (ADBs) 124 disposed along each daisy-chain. Those skilled in the art will appreciate, however, that the number of area distribution boxes (ADBs) 126 may be varied as set forth above. Interconnection between the area distribution boxes (ADBs) 126 is achieved using a single coaxial cable and up to two (2) twisted pair data busses (DATA 1 and DATA 2 busses).

The primary function of each area distribution box (ADB) 126 is to tap off a small portion of the composite PCM/Rf video signal and to pass the remaining portion of the composite PCM/RF video signal to the next area distribution box (ADB) 126 disposed along a given daisy-chain with only a small amount of signal loss. The area distribution box (ADB) then amplifies and splits the tapped portion of the composite PCM/RF video signal for further distribution within the passenger entertainment system 100. More specifically, the composite PCM/RF video signal delivered to each of the area distribution boxes (ADBs) 126 is applied to a first directional tap 502 which taps off a small portion of the signal for use by the receiving area distribution box (ADB) 126 and passes the remaining portion of the signal to the next area distribution box (ADB) 126 disposed along the daisy-chain (if another ADB is present). The tap output of the directional tap 502 is then delivered to a band separation filter 504 which separates the tapped PCM/RF video signal into its respective PCM data and RF video portions. Each portion of the tapped PCM/RF video signal is then passed to an amplifier 506 or 508 where it is amplified, and each of the resulting amplified signals is delivered to a combiner 510 for recombination. Next, the recombined PCM/RF video signal is passed to a series of 2-way splitters 512, 514 or 516 which split the PCM/RF video signal to form four (4) PCM/RF video output signals. Finally, the PCM/RF video output signals are passed to separate floor disconnect boxes (FDBs) 128.

The area distribution boxes (ADBs) 126 also provide a number of control functions and implement an address assignment protocol. More specifically, control data, configuration information, database information and other messages are downloaded from the passenger entertainment system controller (PESC) 122 to the area distribution boxes (ADBs) 126 via a DATA 1 bus. An RS-485 port 520 provides an interface between the DATA 1 bus and the area distribution box (ADB) 126, and the RS-485 port 520 provides data received from the DATA 1 bus to a communications controller 522. Upon receiving a message, the communications controller 522 will first acknowledge receipt of the received message and then determine whether to store (i.e. keep and act on the message data) or to pass the message downline. This determination is made by comparing address information contained within the message to the address of the area distribution box (ADB) 126 as determined by the discrete address inputs 524 to a particular area distribution box (ADB) 126.

An exemplary message format is illustrated in FIG. 7(a) and comprises a start flag 750, a destination seat electronics box (SEB) number 752, a PCU/SDU code 754, destination area distribution box (ADB) number 756, a destination floor disconnect box (FDB) number 758, a destination column address 759, a source seat electronics box address 760 and PCU/SDU code 761, a plurality of data/control bytes 762, a checksum code 764, two cyclic redundancy check bytes 766 and 768, and an end of message flag 770. Further, in a preferred form, the communications protocol comprises a command-response protocol which is centrally controlled by the area distribution box (ADB) 126. More specifically, the each area distribution box (ADB) 126 must initialize any addresses of seat electronics boxes (SEBs) coupled thereto and activate those seat electronics boxes (SEBs) 130 before commencing normal communications.

The communications protocol employed by the area distribution boxes (ADBs) 126 and seat electronics boxes (SEBs) 130 will now be described. Polling of the seat electronics boxes (SEBs) 130 is performed by the area distribution boxes (ADBs) 126 in sequence and by address. It is presently preferred to utilize two types of polls, an active poll (APOLL) and an inactive poll (IPOLL). These poll types correspond to the "activity states" of the seat electronics boxes (SEBs) 130. A seat electronics box (SEB) 130 is active when an area distribution box (ADB) 126 allows it to participate in normal link communications, however, an active seat electronics box (SEB) 130 may only transmit after receiving an APOLL message addressed to it. An active seat electronics box (SEB) 130 can respond with several types of messages including: acknowledge (ACK), byte results (BRES), active status (ASTA), and PSS data. It may be noted that a seat electronics box (SEB) 130 powers up in an inactive mode and can only become active upon command from an area distribution box (ADB) 126. A seat electronics box (SEB) 130 is inactive if it is not permitted to participate in normal link communications. Further, an inactive seat electronics box (SEB) 130 can only transmit in response to IPOLL messages addressed to it from an area distribution box (ADB) 126. After receiving such a message, a seat electronics box (SEB) 130 may only respond with inactive status (ISTA) or byte result(s) (BRES).

Figure 7B:
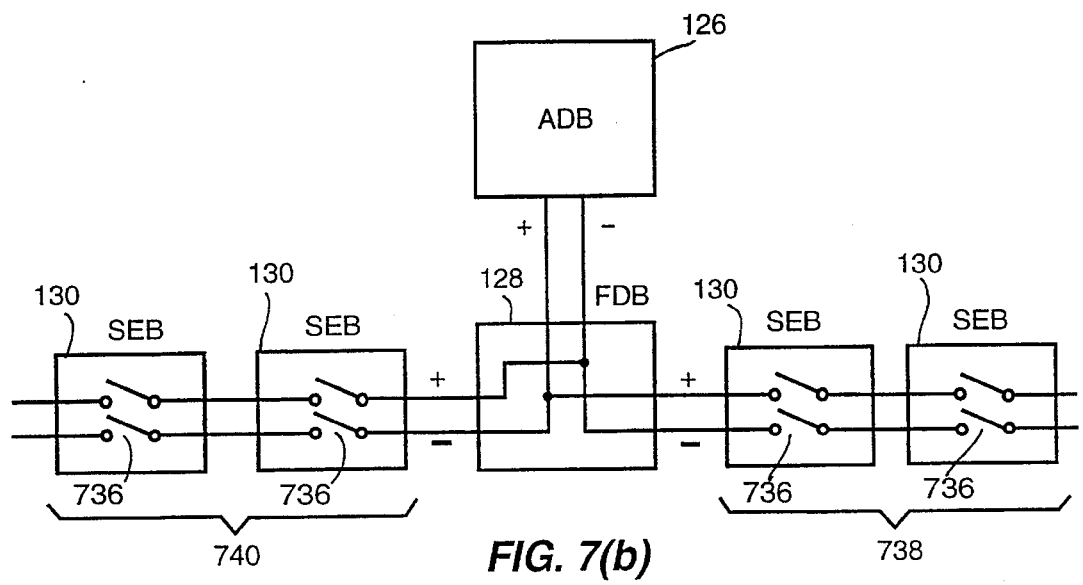
FIG. 7(b) illustrates how relays disposed within a plurality of seat electronics boxes (SEBs) are used in an addressing scheme in accordance with one embodiment of the present invention.

Turning now also to FIG. 7(b), the following process is used to assign the seat electronics boxes (SEBs) 130 addresses on each column. The addressing process may be initiated by either the passenger entertainment system controller (PESC) 122 or an area distribution box (ADB) 126 by sending a programming mode (PMODE) command to the seat electronics box (SEB) 130. When received by a seat electronics box (SEB) 130, the PMODE command causes a communications relay 736, which is normally closed, to open. In this fashion, communications between a given area distribution box (ADB) 126 and a single pair of seat electronics boxes (SEBs) 130 may be established. Moreover, once a PMODE command is distributed over the DATA 1 bus, only seat electronics boxes (SEBs) which are directly adjacent a floor disconnect box (FDB) 128 are able to communicate with their associated area distribution boxes (ADBs) 126. Further, as shown in FIG. 7(b), the lines of the DATA 1 bus, which connect a given area distribution box (ADB) 126 to a pair of seat electronics box (SEB) daisy chains 738 and 740, are inverted with respect to each other within the floor disconnect box (FDB) 128. Further, the seat electronics boxes (SEBs) 130 are configured such that they cannot correctly interpret inverted data. Thus, if an area distribution box (ADB) 126 is to communicate with one of a pair of seat electronics box (SEB) columns (or daisy-chains) 738 it may provide a non-inverted message transmission. However, if that area distribution box (ADB) 126 is to communicate with the other column 740 it must provide an inverted message over the DATA 1 bus. In this fashion, a given area distribution box (ADB) 126 may communicate with a single seat electronics box (SEB) at a time when assigning addresses. Once a given seat electronics box (SEB) 130 has been addressed, the area distribution box (ADB) 126 will activate that seat electronics box (SEB) 130 causing it to close its relay and, thus, to establish communication between the area distribution box (ADB) 126 and the next seat electronics box (SEB) 130 to be addressed. This process continues until all functioning seat electronics boxes (SEBs) 130 have been addressed and activated. Further, by addressing the seat electronics boxes (SEBs) 130 in this fashion, it is possible to identify those seat electronics boxes (SEBs) 130 which are inoperative and to flag those seat electronics boxes (SEBs) 130, which are inoperative, for repair. If all seat electronics boxes (SEBs) 130 are correctly addressed and no defective seat electronics boxes (SEBs) 130 are identified, the link status is reported from the area distribution box (ADB) 126 to the passenger entertainment system controller (PESC) 122 as "normal." If any error is detected while addressing the seat electronics boxes (SEBs) 130, the area distribution box (ADB) 126 will terminate programming of the defective seat electronics box (SEB) 130 by commanding that seat electronics box (SEB) 130 to disable its transmitter (not shown), enter an inactive state, and close its relay 736.

Once "normal" mode is verified, the communication protocol between the area distribution boxes (ADBs) 126 and the seat electronics boxes (SEBs) 130 proceeds as follows. The seat electronics boxes (SEBs) 130 are polled by the area distribution box (ADB) 126 in sequence, and are not allowed to transmit information unless polled. When polled, the seat electronics boxes (SEBs) 130 can transmit various responses but will always send at least a status message. More specifically, when a message is transmitted to a seat electronics box (SEB) 130, the seat electronics box (SEB) 130 will always respond with at least an acknowledgement (ACK) or no-acknowledgement (NAK) message.

FDB Structure and Function

Figure 8:
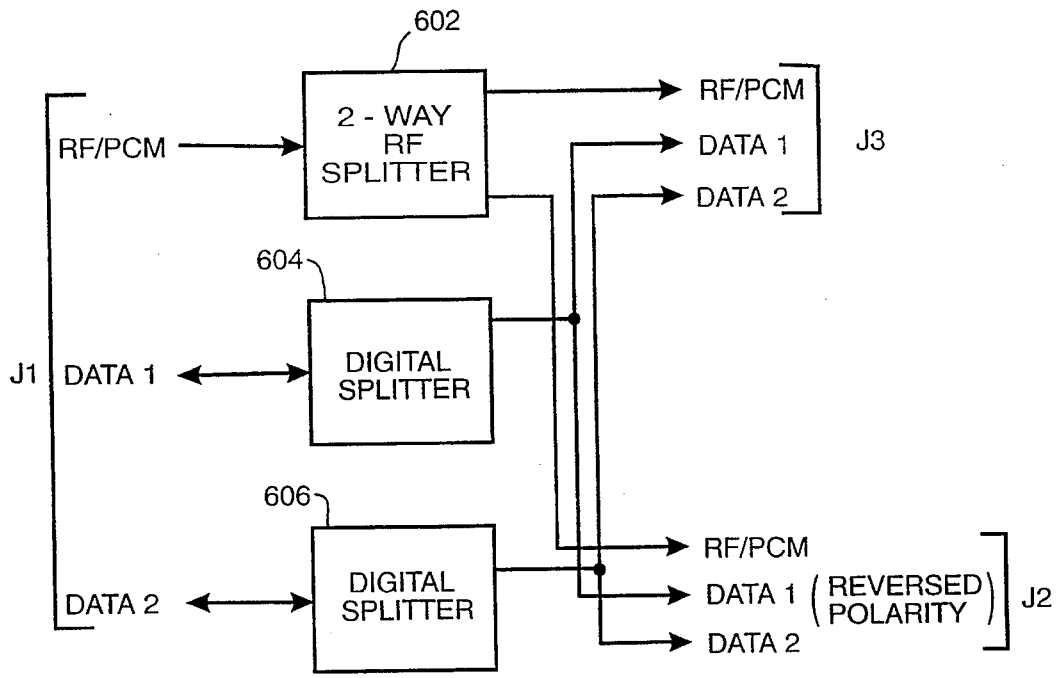
FIG. 8 is a block diagram of the circuitry comprising a floor disconnect box (FDB) in accordance with a preferred form of the present invention.

Turning now to FIG. 8, in a preferred form each floor disconnect box (FDB) 128 comprises a PCM/RF video signal splitter and two (2) digital data signal splitters 604 and 606. The PCM/RF video signal splitter 602 receives the composite PCM/RF video signal from an area distribution box (ADB) 126, splits that signal, and delivers each of the resulting split PCM/RF video signals to a separate seat electronics box (SEB) 130. The digital data signal splitters 604 and 606, which split the DATA 1 and DATA 2 signals and function in a similar fashion. However, after splitting, the polarity of one of the resulting split DATA signals is reversed.

SEB Structure and Function

Turning now to FIG. 9, each seat electronics box (SEB) 130 comprises a signal input board 701, an audio signal processing board 703, a video signal processing board 705, and a microcontroller unit (MCU) board 707. The input board 701 contains passive circuitry connecting each seat electronics box (SEB) 130 to a floor disconnect box (FDB) 128 or another seat electronics box (SEB) 130 (i.e. the next SEB along a daisy-chain). The composite PCM/RF video signal delivered to each of the seat electronics boxes (SEBs) 130 is applied to a directional tap 702 which taps off a small portion of the signal for use by the receiving seat electronics box (SEB) 130 and passes the remaining portion of the signal to the next seat electronics box (SEB) 130 disposed along the daisy-chain (if another SEB is present). The tap output of the directional tap 702 is filtered by band-splitting filters 704 prior to further distribution within the seat electronics box (SEB) 130. More specifically, the band-splitting filters 704 comprise a high pass filter and a low pass filter (not shown). The RF video portion of the composite signal is passed by the high pass filter and the PCM portion of the composite signal is passed by the low pass filter. After filtering, the PCM portion of the composite signal is delivered to the audio board 703, and the RF video portion of the composite system is delivered to the video board 705. Upon reaching the audio board 703, the PCM portion of the composite signal is passed through an analog amplifier 730, passed through an amplitude comparator 732, and applied to one input of an integrated video audio system (IVAS) gate array 706. The IVAS gate array 706 functions as a decoder and is capable of selecting desired PCM data channels from the composite PCM data signal. After one or more channels are selected by the IVAS gate array 706, those channels are delivered to an ADPCM gate array 708 for decompression. After decompression, the selected channels are delivered to a pair of MASH digital-to-analog (D/A) converters 710, where they are separated, converted to analog audio signals, and passed on to a headphone amplifier 712.

In a particularly innovative aspect of the present invention, the IVAS gate array 706 of a given seat electronics box (SEB) 130 may be instructed to select a non-existent channel from the composite PCM data signal and, in doing so, to provide a "zero channel" output to the ADPCM gate array 708. A zero channel output is an output channel which comprises a constant value and, thus, when converted to an analog format does not vary in amplitude. Accordingly, when a zero channel is converted to an analog format and delivered to an audio transducer, no audio is produced. Moreover, when a zero channel output is processed by the ADPCM gate array 708, the MASH digital-to-analog converter 710, and the headphone amplifier 712 as set forth above, an analog audio signal having no amplitude variation is produced and may be provided to a noise cancelling headset (not shown). The noise cancelling headset may be utilized by a passenger wearing that headset to block out substantially all flight noise, cabin noise and the like. It is appreciated that one of the compressed digital audio channels might be used as a zero channel in an alternative embodiment. However, it is presently preferred to provide a maximum number of audio channels for passenger listening, and providing a separate zero channel would reduce the number of channels available for that purpose.

In another innovative aspect, the passenger entertainment system 100 of the present invention may be configured to maintain the delivery of a previously selected audio channel to a passenger's headset, when that passenger selects a video channel for viewing and that video channel is not accompanied by any audio channel(s). More specifically, the IVAS gate array 706 of the seat electronics box (SEB) 130 may be configured or programmed by the microprocessor 718 to switch audio channels only when a new audio channel is selected either directly or implicitly by a passenger using the digital passenger control unit (DPCU) 134.

The RF video portion of the composite signal is delivered from the board splitting filters 704 to the video board 705. More specifically, the RF video portion of the composite signal is delivered to a signal splitter 734 and then to one of up to three (3) video signal tuners 714, each of which is controlled by a tuner control circuit 716. It may be noted that the signal splitter 734 isolates the video tuners 714 from one another. As set forth above, the tuner control circuits 716 are controlled via the microprocessing unit (MPU) 718 and one of a plurality of digital passenger control units (DPCUs) 134. The video tuner control circuits 716 are each, in turn, coupled to a single video tuner 714 which is capable of selecting a desired video channel from the composite RF video signal. After a particular video channel is selected, the video processing circuit delivers that channel to a seat display unit (SDU) 116 for display.

The microcontroller unit (MCU) board 707 comprises a micro-controller 718, an RS-485 port 720 for communication with the DATA 1 bus, an address assignment relay 721, and a DPCU interface 722 for communication with the digital passenger control units (DPCUs) 134. The micro-controller 718 receives and transmits communication data on the DATA 1 bus via the RS-485 port 720, provides serial communications to the digital passenger control units (DPCUs) 134 via the DPCU interface 722, and controls the internal operations (i.e. channel selection by the IVAS gate array 706 and video processing circuits 714) of the seat electronics box (SEB) 130 via an internal bus 724. In a preferred form, the micro-controller 718 comprises an eight (8) bit controller having 512 bytes of static RAM and an internal analog-to-digital converter (not shown).

In a particularly innovative aspect of the present invention, the microcontroller 718 of one seat electronics box (SEB) 130 may be configured to communicate with the microcontroller 718 of another seat electronics box (SEB) 130 via the DATA 1 bus. This enables a digital passenger control unit (DPCU) 134 disposed at a first seat location to provide video channel selection data through a first seat electronics box (SEB) servicing that seat location to a second seat electronics box (SEB) 130 servicing a seat location one row forward of the first seat location. Thus, a seat display unit (SDU) 116, which receives selected video signals from the second seat electronics box (SEB) 130 and is mounted in the back of the forward seat, may be controlled using the digital passenger control unit (DPCU) 134 disposed at the rearward seat without providing an additional communications link between the two seats.

IVAS Gate Array Structure and Function

The structure and function of the integrated video audio system (IVAS) gate arrays 310, 410, and 706 shall be explained with reference to FIGS. 10–12. However, it should be understood that the structure of the integrated video audio system (IVAS) gate arrays 310, 410, and 706 does not vary throughout the passenger entertainment system 100; only the function of the integrated video audio system (IVAS) gate arrays 310, 410, and 706 is varied. Moreover, an integrated video audio system (IVAS) gate arrays 310, 410, or 706 comprises a single chip which functions in a different manner depending upon where it is disposed within the passenger entertainment system 100. Thus, in a preferred form the same IVAS gate array chip may be used in the video system control unit (VSCU) 120, the passenger entertainment system controller (PESC), or any of the seat electronics boxes (SEBs) 130. The function of the chip will vary, however, depending upon where it is disposed.

Figure 10:
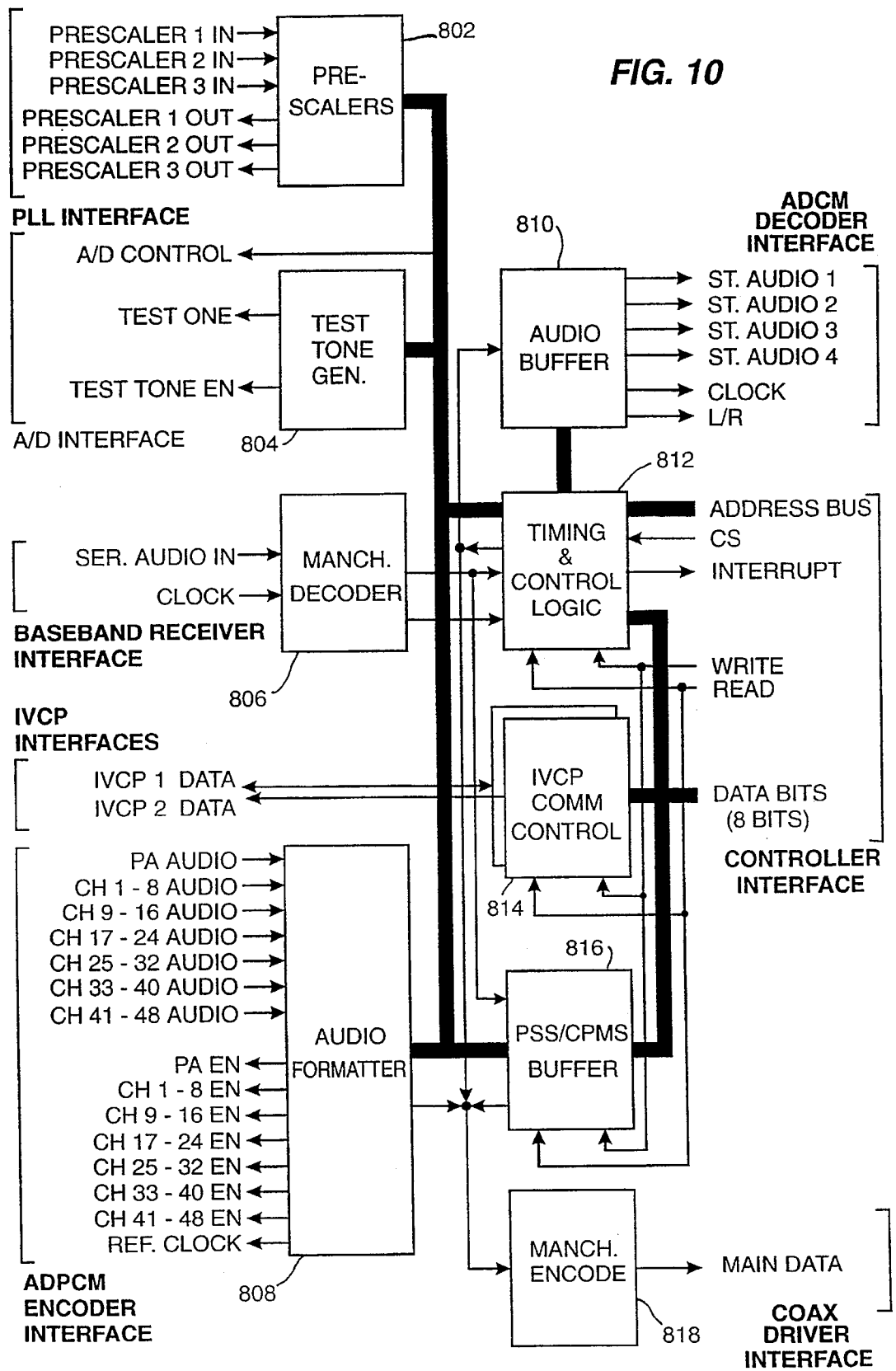
FIG. 10 is a block diagram illustrating the functional blocks comprising an integrated video audio system (IVAS) gate array in accordance with a preferred form of the present invention.

Referring first to FIG. 10, each IVAS gate array 310, 410, or 706 comprises nine (9) functional blocks including a plurality of pre-scalers 802, a test tone generator 804, a Manchester decoder 806, a audio formatter 808, an audio buffer 810, timing and control logic 812, a communications controller 814, a PSS/CPMS buffer 816, and a Manchester encoder 818.

The pre-scalers 802 comprise one portion of a phase lock loop circuit (not shown) and divide down by a programmable factor the frequency of a plurality of signals delivered to their inputs (not shown). The phase lock loop circuit comprises a phase detector, filter circuitry, and a voltage controlled oscillator (VCO) (none of which are shown), each disposed externally of the IVAS gate array, and the pre-scalers 802 disposed within the IVAS gate array. Each phase lock loop generates a clock phase locked to the PCM data signal. The clock frequencies are programmable multiples or sub-multiples of a clock derived from the bit rate (i.e. the data transfer rate) and are provided to the ADPCM gate arrays 306, 318, 406, 418, and 708 and the MASH analog-to-digital and digital-to-analog converters 302, 320, 404, 416, and 710. In this fashion, sync is maintained throughout the passenger entertainment system 100 based on the frame transfer rate of 37.8 kHz.

The Manchester decoder 806 receives clock and serial audio data in Manchester code from a baseband receiver interface 820. The Manchester decoder 806 decodes the received serial audio data into NRZ (non-return to zero) and detects a unique data pattern used for system synchronization. Upon detecting the synchronization signal a pulse is generated by the Manchester decoder 806 and passed to the timing and control logic block 812. In addition, the NRZ serial audio data is delivered from the Manchester decoder 806 to the audio buffer 810, the Manchester encoder 818, and the CPMS buffer 816.

The test tone generator 804, which comprises a shift register, a counter, and a control logic (not shown), is used for testing signal distribution within the passenger entertainment system 100. More specifically, the test tone generator 804 is capable of generating a square wave having a programmable frequency and providing that square wave to one input of a MASH analog-to-digital converter (not shown) disposed within the passenger entertainment system control (PESC) 122. The MASH analog-to-digital converter converts the square wave to a digital format and passes the converted digital signal to an ADPCM gate array 410 as set forth above. The ADPCM gate array 410 compresses the converted digital signal and provides the resulting compressed signal to one input of the IVAS gate array 410, where it is multiplexed into the compressed PCM data signal and distributed throughout the passenger entertainment system 100. Test tone detection circuits (not shown) disposed in the seat electronics boxes (SEBs) 130 detect the presence or absence of the test tone within the PCM data signal and provide an indication of the existence or non-existence of the test tone to the passenger entertainment system controller (PESC) 122.

The audio formatter 808 comprises nine 32-bit audio sample shift registers (one shift register per eight audio input channels) and a 64-bit RF shift register (none of which are shown). The primary function of the audio formatter 808 is to insert bit stream data received from the compressed digital audio signal sources 102 and the ADPCM gate arrays 306, 406, and 418 into the composite PCM data signal. More specifically, the audio formatter 808, under control of the timing and control logic block 812, inserts audio, range, and filter data into the composite PCM data signal in the frame format illustrated in FIG. 11. A fixed relationship is provided between each input port 820 of the audio formatter 808 and the time slots into which audio and control data are inserted.

Figure 11:
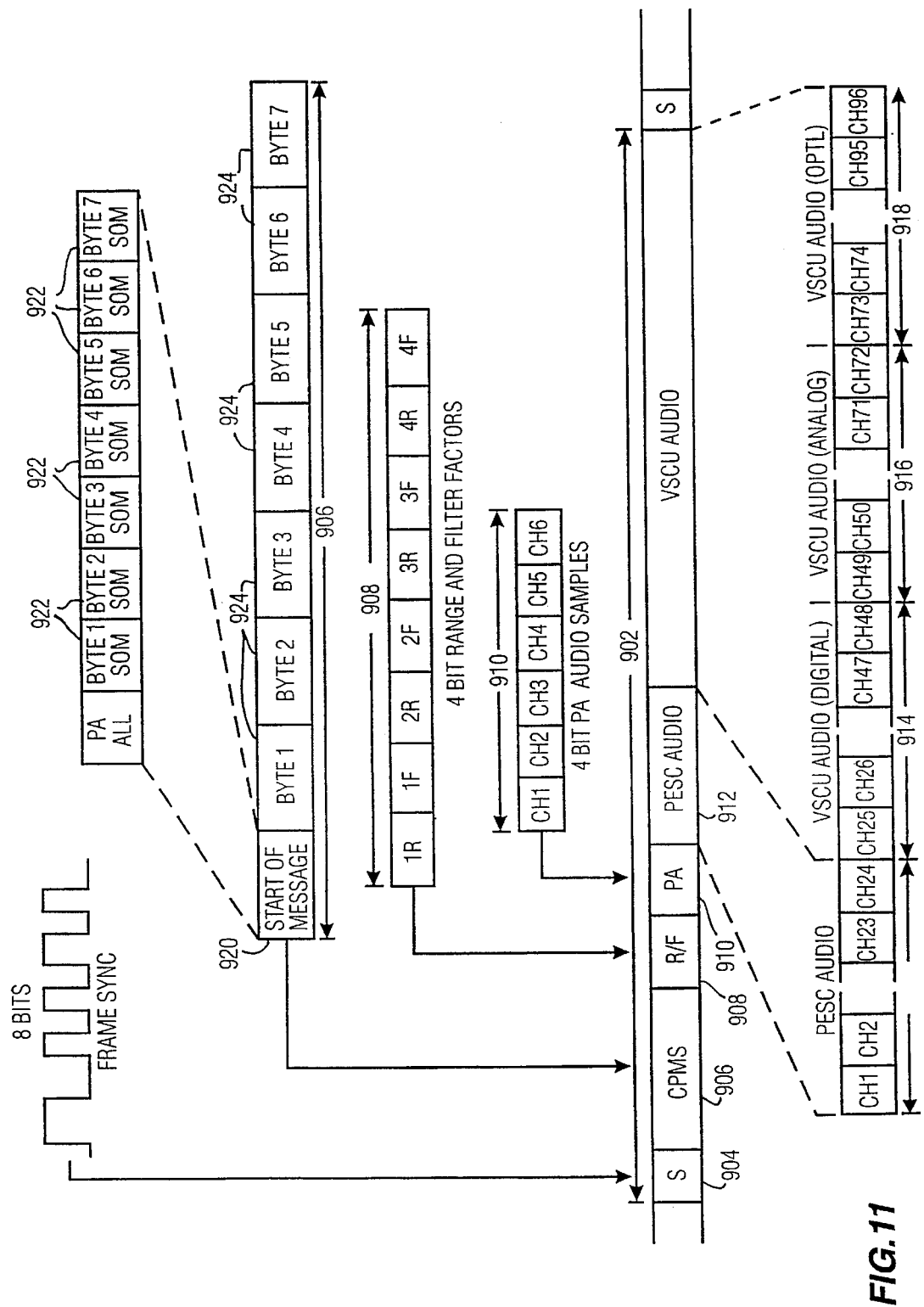
FIG. 11 is an illustration of a frame format in accordance with a preferred form of the present invention.

As shown in FIG. 11, each frame 902 of the composite PCM data signal comprises eight (8) sync bits 904, sixty-four (64) cabin passenger management system (CPMS) data bits 906, thirty-two (32) range and filter factor (R/F) bits 908, six (6) channels comprising twenty-four (24) bits of passenger address (PA) audio 910, twenty-four (24) channels comprising ninety-six (96) bits of passenger entertainment system controller (PESC) audio 912, twenty-four (24) channels comprising ninety-six (96) bits of video system controller unit (VSCU) digital audio 914, twenty-four (24) channels comprising ninety-six (96) bits of video system controller unit (VSCU) analog audio 916, and twenty-four (24) channels comprising ninety-six (96) bits of video system controller unit (VSCU) optional digital or analog audio 918. The term "analog," as used in the preceding sentence, denotes that a particular signal was originally generated by an analog audio source. Accordingly, in a preferred form a maximum of 512 bits are provide per frame 902. It should be noted, however, that the frame format may be varied substantially depending upon the number data types and number of bits per data type which are to be carried over the signal distribution network. Moreover, it is also preferred that the frame format of the IVAS gate array be programmably variable, such that it may be altered to accommodate the needs of a given passenger entertainment system or aircraft environment.

Turning now also to FIGS. 12(*a*) and 12(*b*) and TABLE 2, those skilled in the art will appreciate that, when digital data is compressed using adaptive delta pulse code modulation to the CD-I, level B format, the data is not merely compressed from a 16-bit format to a 4-bit format. Additional range and filter factors 908 are added to the data. These factors, thus, become an essential component of the composite PCM data signal and present difficult problem in the context of frame formatting. More specifically, ADPCM compression produces one 4-bit range factor and one 4-bit filter factor for each channel in a twenty-eight frame audio sample. Thus, if 102 channels of ADPCM compressed digital audio (six PA channels, twenty-four PESC audio channels, and seventy-two VSCU audio channels) are to be distributed throughout a passenger entertainment system 100, a 4-bit range factor and a 4-bit filter factor must be provided for each of those 102 channels every twenty-eight frames. In a worst case scenario, transmission of the range and filter (R/F) factors could require that a 816-bit data block be dedicated solely to range and filter factors and accompany each frame of compressed digital audio. In contrast, when a frame format in accordance with the present invention is utilized, only 32-bits are provided per frame to accommodate the range and filter (R/F) factors. This substantial reduction in the number of bits per frame needed to accommodate the range and filter factors is accomplished by staggering the range and filter factors over a number of frames as indicated in TABLE 2.

TABLE 2

AUDIO BLOCK TRANSMISSION FORMAT

| COAX FRAME | AUDIO SYNC | RANGE/FILTER CHANNEL NO.s | SAMPLE NO. 1 CHANNEL NO.s |
|---|---|---|---|
| 1 | 1 | — | |
| 2 | 0 | PA1–4 | PA1–PA6 |
| 3 | 0 | PA5–6 | |
| 4 | 0 | 1–4 | 1–8 |
| 5 | 0 | 5–8 | |
| 6 | 0 | 9–12 | 9–16 |
| 7 | 0 | 13–16 | |
| 8 | 0 | 17–20 | 17–24 |
| 9 | 0 | 21–24 | |
| 10 | 0 | 25–28 | 25–32 |
| 11 | 0 | 29–32 | |
| 12 | 0 | 33–36 | 33–40 |
| 13 | 0 | 37–40 | |
| 14 | 0 | 41–44 | 41–48 |
| 15 | 0 | 45–48 | |
| 16 | 0 | 49–52 | 49–56 |
| 17 | 0 | 53–56 | |
| 18 | 0 | 57–60 | 57–64 |
| 19 | 0 | 61–64 | |
| 20 | 0 | 65–68 | 65–72 |
| 21 | 0 | 69–72 | |
| 22 | 0 | 73–76 | 73–80 |
| 23 | 0 | 77–80 | |
| 24 | 0 | 81–84 | 81–88 |
| 25 | 0 | 85–88 | |
| 26 | 0 | 89–92 | 89–96 |
| 27 | 0 | 93–96 | |
| 28 | 0 | — | |
| 29 | 1 | — | |
| 30 | 0 | PA1–4 | PA1–PA6 |
| 31 | 0 | PA5–6 | |
| 32 | 0 | 1–4 | 1–8 |
| 33 | 0 | 5–8 | |
| 34 | 0 | 9–12 | 9–16 |
| 35 | 0 | 13–16 | |
| . | . | . | . |
| . | . | . | . |
| . | . | . | . |

Figure 13B:
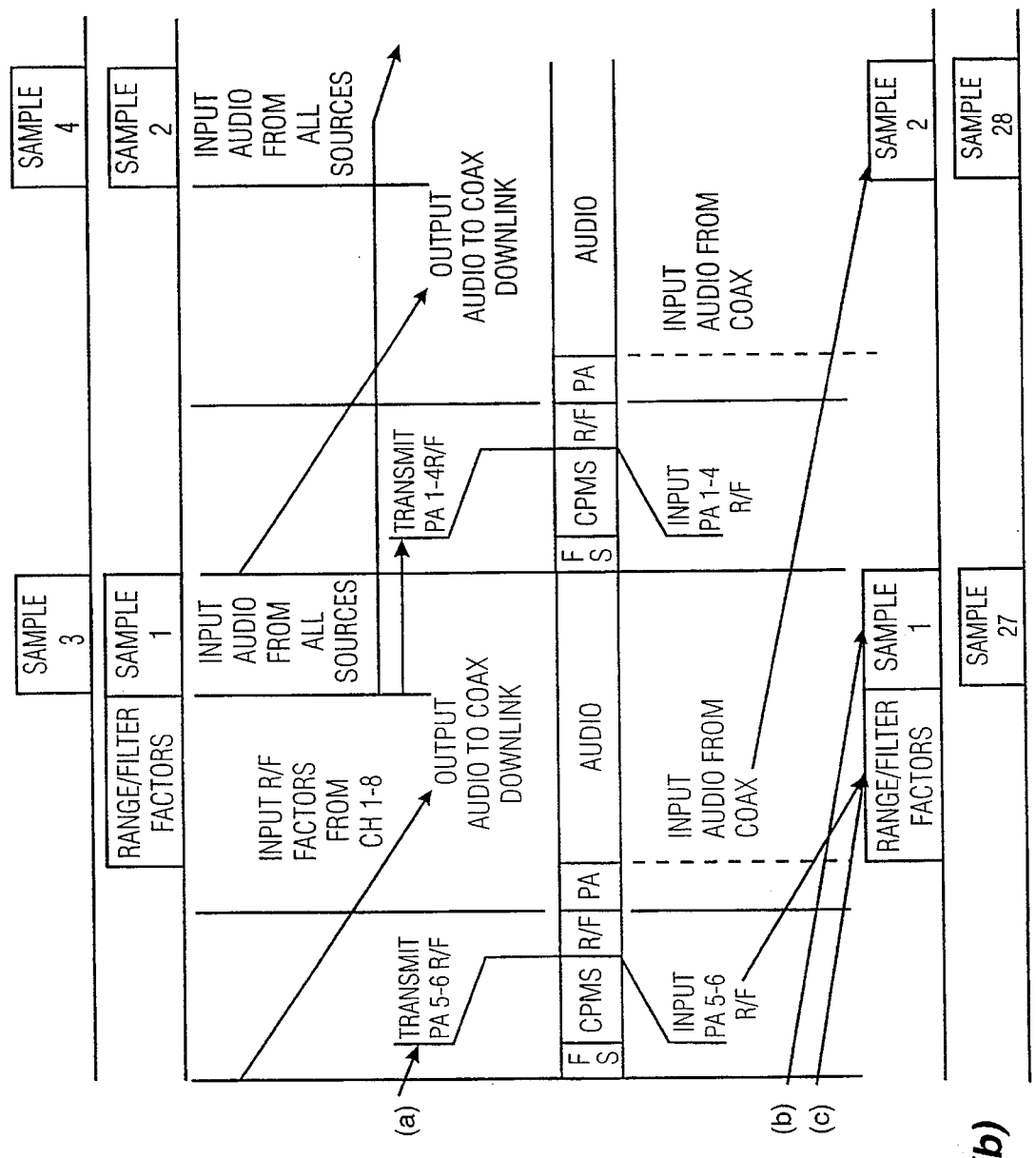

More specifically, as shown in FIGS. 11, 12(*a*) and 12(*b*) range and filter (R/F) factors 908 corresponding to only four channels of compressed digital audio data are provided in a given frame, and range and filter (R/F) factors 908 corresponding to distinct groups of four channels each are provided in successive frames. In this fashion, the range and filter (R/F) factors 908 corresponding to all 102 compressed digital audio channels are provided over the course of a total of twenty-six frames (e.g. frame Nos. 2–26 as shown in TABLE 2). Further, it is presently preferred to stagger samples of PA and audio data over the course of twenty-eight frames (i.e. one sample per channel per frame). More specifically, each sample of PA or audio data comprises eight channels (or time slots). Thus, twenty-eight samples of each group of eight channels (i.e. one sample per frame) are provided within each block of PA and audio data. The samples are ordered such that the first sample (Sample 1) of a given eight channel group falls within the frame containing the range and filter (R/F) factors 908 corresponding to the first channel in the group. For example, the range and filter (R/F) factors 908 corresponding to audio channel No. 1 are placed in frame No. 3, and thus, the first sample (Sample No. 1) of audio channel Nos. 1–8 is also placed in frame No. 3. Similarly, the range and filter (R/F) factors 908 corresponding to audio channel No. 9 are placed in frame No. 5, and thus, the first sample (Sample No. 1) of audio channel Nos. 9–16 is also placed in frame No. 5. It will also be noted that it is presently preferred to place even numbered audio samples in odd numbered frames and odd numbered audio samples in even numbered frames on the coaxial transmission cable. Turning now also to FIGS. 13(*a*) and 13(*b*), the reason for this is that digital audio data, which is received by the audio formatter 808 during a given frame, is not simultaneously delivered to the coaxial downlink (not shown). Instead, digital audio data received by the audio formatter 808 during one frame is delivered to the coaxial downlink during the following frame. Further, range and filter data 908, which is received by the audio formatter 808 during one frame, is split and delivered to the coaxial downlink over the course of the following two frames. When digital audio data is received by the audio buffer, the digital audio data from a given frame is stored in a current data register during that frame and shifted to an output register during the next frame. In contrast, range and filter factor data is read and shifted out, as soon as the register assigned thereto is filled (i.e. every two frames). For these reasons, it is preferred that the audio sampling rate of the audio formatter 808 and the audio buffer 810 be set equal to the frame transfer rate (i.e. equal to approximately 37.8 kHz), and that synchronization within the passenger entertainment system 100 be maintained based upon the frame transfer rate.

It should be understood that it is not intended to limit the present invention to the particular frame format depicted in FIG. 11, 12(*a*), 12(*b*), 13(*a*) and 13(*b*), as that format may be varied substantially in accordance with the present invention. For example, it will be noted that the composite PCM data signal comprises a plurality of compression blocks having F frames per block, C digital audio channels per frame, and P compression parameters per channel per block; and any of these parameters (especially the number of digital audio channels C provided per frame) may be varied. However, in a preferred form the multiplexer 14 or IVAS gate array 310 or 410, as the case may be, will be configured to allocate N time slots per frame for the compression parameters (N being an integer equal to or greater than $(C \times P)/F$) and to assign selected groups of the compression factors (each group comprising N of said compression factors) to selected frames within each compression block.

As for the sync signals 904 and 905, a unique audio sync pattern 904 (such as that shown in FIG. 11) is provided within the composite PCM data signal once every twenty-eight frames, and the inverse of that pattern, the frame sync pattern 905, is provided between all other frames, as shown in FIGS. 12(*a*) and 12(*b*).

Turning again to FIG. 10, the audio buffer 810 comprises four pairs of 4-bit shift registers, twelve 8-bit shift registers, and four 16-bit shift registers (none of which are shown). The pairs of 4-bit shift registers are used to acquire left and right channel audio samples for each of up to four passenger seats. When the samples of each pair are acquired, the contents of each pair of shift registers are transferred into a single 8-bit shift register. The channels are then transferred out of the 8-bit shift register as a single eight bit signal comprising two multiplexed, compressed, digital audio channels. The resulting signal is then delivered to one input of an ADPCM gate array 706. The remaining eight 8-bit shift registers are used for acquiring the compression factors for the left and right channels for each of up to four passenger seats. When the compression (range and filter) factors are acquired, they are transferred into the 16-bit shift registers and then shifted out on the same multiplexed output lines as the compressed digital audio sample to which they correspond.

Control of the data selection process is provided by the timing and control logic 812, which generates control signals for enabling the shift registers to shift in selected audio channels. More specifically, the timing and control logic 812, in response to signals received from, for example, a digital passenger control unit (DPCU) 134, enables the shift registers to receive data located at a selected channel number time slot. A counter, which is reset upon receipt by the timing and control logic 812 of a sync signal, is utilized to provide channel number information. Thus, when a channel number selected by the digital passenger control unit (DPCU) 134 reaches the timing and control logic 812, the data located in the corresponding time slot is passed to the shift registers. Thus, during operation a first shift register of a pair will acquire an audio data sample from the composite PCM data stream and pass that sample to the second register of the pair. The second shift register will then pass the acquired sample to the ADPCM interface, as the first shift register acquires another sample from the following frame of the PCM data stream. It may be noted that in the "zero channel" mode described above, a channel number of a non-existent channel is provided by the digital passenger control unit (DPCU) 134 to the timing and control logic 812. As the timing and control logic 812 never receives data corresponding to the channel selected, no new data is entered into the first shift register, and any data previously entered into the first shift register will be repeatedly passed on to the second shift register and eventually to the ADPCM gate array 708.

The timing and control logic 812 controls all timed operations within the IVAS gate array 310, 410, and 708. For example, when the IVAS gate array 310, 410, or 708 acts as a demultiplexer, the control logic 812 steers selected audio channels to the audio buffers 810 and divides down the clock to provide proper timing references for the serial interfaces. The timing and control logic 812 also provides address decoding to enable appropriate registers (not shown) for communication with the micro-controllers 430 or 718 or the central processing unit 316.

The IVCP communications controller 814 manages the communication protocol between the IVAS gate array 706 (of the SEB 130) and the in-seat video cassette players (IVCPs) 138.

The PSS/CPMS buffer 816 comprises a 16-bit shift register, a mod 8 bit counter, a 32 byte FIFO, a status register, a control register, a 16-bit address register and control logic (none of which are shown). This hardware is controlled to operate in one of two different modes depending upon whether the IVAS gate array is disposed within a seat electronics box (SEB) 130 or the passenger entertainment system controller (PESC) 122.

When disposed within a seat electronics box (SEB) 130, the PSS/CPMS buffer 816 is configured to perform a receive function. A start of message byte 920 (shown in FIG. 11) is used to determine the start and end of a message. Each bit in the start of message byte 920 except the first bit 921 corresponds to a data byte 924 in the CPMS field 906. When a start of message bit 922 is high, the channel may be idle or a new message may begin in the message byte 924 corresponding to that start of message bit 922. When the start of message bit 922 is low, message data is present. After the message ends, the start of message bit will return to a high state for the next data byte indicating that the message has ended and that a new message is potentially starting. The control logic also compares the address field in each message against the address of the local unit. An interrupt signal may be provided to the microcontroller 718 when the addresses are the same.

When disposed within the passenger entertainment system controller (PESC) 122, the PSS/CPMS buffer 816 performs the reverse of the function performed in the seat electronics box (SEB) 130. More specifically, the PSS/CPMS buffer 816 will accept messages from the microcontroller interface one byte at a time. The bytes are queued up in a FIFO. The timing and control logic 812 provides an envelope signalling when the PSS/CPMS buffer may place data into the serial bit stream (PCM data signal). The queued bytes are strobed into a shift register and shifted out while the envelope is active. Further, as set forth above, the start of message byte is inserted before the message bytes. The control logic also makes sure that the first byte of a message is the first byte after the start of message byte.

The Manchester encoder 818 encodes the formatted bit stream and generates a programmable sync pattern at appropriate times. The Manchester encoder 818 comprises a 16-bit register, a 16-bit shift register, a multiplexer, a plurality of gates and a flip-flop (non of which are shown). The register holds the sync pattern loaded by the host processor. During most of a downlink frame, the sync pattern is constantly loaded into the shift register. When the sync is to be transmitted, the shift register shifts out the sync at twice the bit rate. An XOR gate is used to control the polarity of the sync. The multiplexer selects between the sync or data based on an external control signal (sync enable signal provided by the timing and control logic 812). The flip-flop is used to reclock the edges after encoding the data.

While the present invention is susceptible to various modifications and alternative forms, specific representations and illustrations thereof have been shown, by way of example, in the drawings and are herein described in detail. It should be understood, however, that it is not intended to limit the invention to the particular systems and methods disclosed, but on the contrary, the invention is to cover all modifications, equivalents, and alternatives falling within the spirit and scope of the invention as defined by the appended claims.

What is claimed is:

1. A digital audio distribution system for use on aircraft and other vehicles comprising:

a plurality of digital signal sources for generating a plurality of compressed digital audio signal outputs;

a multiplexer having a plurality of signal input terminals for receiving said compressed digital audio signal outputs, said multiplexer being adapted to time domain multiplex said compressed digital audio signal outputs to produce a single composite data signal;

a demultiplexer adapted to receive said composite data signal and to select a desired channel from said composite data signal;

a decompression circuit adapted to receive said selected channel from said demultiplexer and to decompress said selected channel to produce a decompressed digital output signal; and a digital-to-analog converter adapted to receive said decompressed digital output signal and to convert said decompressed digital output signal to an analog audio signal; wherein said composite data signal comprises a plurality of compression blocks having F frames per block, C digital audio channels per frame, and P compression parameters per channel;

said multiplexer is configured to allocate N time slots per frame for said compression parameters, N being an integer equal to or greater than $(C \times P)/F$; and said multiplexer assigns selected groups comprising N of said compression factors to selected frames within each compression block.

2. A method of distributing within an commercial aircraft or other passenger vehicle, said method comprising the steps of:

generating a plurality of compressed digital audio signal outputs;

providing said plurality of compressed digital audio signal outputs directly to a multiplexer;

time domain multiplexing said compressed digital audio signal outputs to produce a composite digital audio data signal;

delivering said composite digital audio data signal to a demultiplexer disposed at a location remote from said multiplexer;

selecting a channel from said composite digital audio data signal;

decompressing said selected channel to produce an expanded digital audio signal;

converting said expanded digital audio signal to an analog signal; and providing said analog audio signal to an audio transducer; wherein said composite digital audio data signal comprises a plurality of compression blocks having F frames per block, C digital audio channels per frame, and P compression parameters per channel; and said time domain multiplexing step comprises the steps of:

allocating N time slots per frame for said compression parameters, N being an integer equal to or greater than $(C \times P)/F$; and assigning selected groups comprising N of said compression factors to selected frames within each compression block.

* * * * *